(12) United States Patent
Tokunaga

(10) Patent No.: US 7,893,394 B2
(45) Date of Patent: Feb. 22, 2011

(54) OPTICAL DEVICE, IMAGE READING DEVICE, AND FILTER MANUFACTURING METHOD

(75) Inventor: Atsuo Tokunaga, Kanagawa (JP)

(73) Assignee: Ricoh Company Limited, Tokyo (JP)

(*) Notice: Subject to any disclaimer, the term of this patent is extended or adjusted under 35 U.S.C. 154(b) by 166 days.

(21) Appl. No.: 12/289,856

(22) Filed: Nov. 6, 2008

(65) Prior Publication Data

US 2009/0134316 A1 May 28, 2009

(30) Foreign Application Priority Data

Nov. 6, 2007 (JP) .............................. 2007-288337
Oct. 31, 2008 (JP) .............................. 2008-280883

(51) Int. Cl.
*G01J 3/50* (2006.01)
*G03G 15/01* (2006.01)
*H01L 27/00* (2006.01)
*H04N 1/04* (2006.01)

(52) U.S. Cl. .................... 250/226; 250/208.1; 358/512; 358/514

(58) Field of Classification Search ............. 250/208.1, 250/234, 235, 236, 226; 358/512, 513, 514
See application file for complete search history.

(56) References Cited

U.S. PATENT DOCUMENTS

| | | | | |
|---|---|---|---|---|
| 4,642,679 A | * | 2/1987 | Nagano | 358/509 |
| 4,670,779 A | * | 6/1987 | Nagano | 358/512 |
| 4,827,118 A | * | 5/1989 | Shibata et al. | 257/432 |
| 4,855,818 A | * | 8/1989 | Morimoto et al. | 358/512 |
| 5,010,415 A | * | 4/1991 | Suzuki | 358/302 |
| 5,055,921 A | * | 10/1991 | Usui | 358/512 |
| 5,665,963 A | * | 9/1997 | Campbell | 250/226 |
| 5,940,191 A | * | 8/1999 | Tsai | 358/512 |
| 5,978,105 A | * | 11/1999 | Sharman et al. | 358/512 |
| 6,191,872 B1 | * | 2/2001 | DeCaro et al. | 358/509 |
| 6,771,401 B2 | * | 8/2004 | Chen | 358/512 |
| 7,071,979 B1 | * | 7/2006 | Ohtani et al. | 348/269 |
| 7,339,709 B2 | * | 3/2008 | Sakakibara | 358/514 |
| 7,391,008 B2 | * | 6/2008 | Fouquet et al. | 250/226 |
| RE41,018 E | * | 12/2009 | Chen | 358/512 |
| 7,720,406 B2 | * | 5/2010 | Tokunaga | 399/98 |
| 2004/0212847 A1 | * | 10/2004 | Bliley et al. | 358/474 |
| 2004/0212858 A1 | * | 10/2004 | Hosier et al. | 358/510 |
| 2006/0103864 A1 | * | 5/2006 | Shannon et al. | 358/1.9 |
| 2006/0119849 A1 | * | 6/2006 | Levey et al. | 356/419 |

(Continued)

FOREIGN PATENT DOCUMENTS

JP         2004-144859         5/2004

(Continued)

*Primary Examiner*—John R Lee
(74) *Attorney, Agent, or Firm*—Harness, Dickey & Pierce, P.L.C.

(57) ABSTRACT

A light emitting element has spectral characteristics in a predetermined optical wavelength range. A photodetecting unit includes a photodetecting element capable of detecting a light in the optical wavelength range and performs an OE conversion of either one of a reflected light and transmitted light from a scanning target. A filter unit is arranged in an optical path from the light emitting element to the photodetecting element via the scanning target and having an optical transmission range within the optical wavelength range and covering a range of variation in the optical wavelength range.

5 Claims, 19 Drawing Sheets

U.S. PATENT DOCUMENTS

| | | | |
|---|---|---|---|
| 2006/0256405 A1* | 11/2006 | Lin | 358/512 |
| 2006/0291061 A1* | 12/2006 | Iyama et al. | 359/614 |
| 2007/0024931 A1* | 2/2007 | Compton et al. | 358/512 |
| 2007/0268533 A1* | 11/2007 | Kijima et al. | 358/512 |
| 2009/0091760 A1* | 4/2009 | Ehbets et al. | 356/419 |
| 2009/0134316 A1* | 5/2009 | Tokunaga | 250/226 |

FOREIGN PATENT DOCUMENTS

| | | |
|---|---|---|
| JP | 2005-033834 | 2/2005 |
| JP | 2005-067521 | 3/2005 |
| JP | 2005-182170 | 7/2005 |

* cited by examiner

SPECTRAL CHARACTERISTICS OF LED

OPTICAL DEVICE, IMAGE READING DEVICE, AND FILTER MANUFACTURING METHOD

CROSS-REFERENCE TO RELATED APPLICATIONS

The present application claims priority to and incorporates by reference the entire contents of Japanese priority document 2007-288337 filed in Japan on Nov. 6, 2007 and Japanese priority document 2008-280883 filed in Japan on Oct. 31, 2008.

BACKGROUND OF THE INVENTION

1. Field of the Invention

The present invention relates to a filter used for optically reading an image from an original in an image reading device.

2. Description of the Related Art

An image reading device installed in a color image processing apparatus such as a color facsimile machine, a color scanner, a color copier, or a color multifunction peripheral generally includes an optical unit for reading images from originals. The optical unit is typically provided with light emitting elements that emit lights with wavelengths corresponding to RGB colors (red, green, and blue), respectively, to support color originals in predetermined sizes. Such light emitting elements emit lights for RGB at different emission timings, respectively, and the emitted lights are applied as reading lights to an original. The reading lights are then reflected from the original and the reflected lights are input into a photodetecting unit in the optical unit to form an image. The photodetecting unit outputs an electrical signal corresponding to an image read from the original.

Generally, LED (Light Emitting Diode) devices are employed as light emitting elements in optical units of color image reading devices, which is disclosed in, for example, Japanese Patent Application Laid-open No. 2004-144859.

One characteristic of a typical LED device is that an optical wavelength range of spectral characteristics of an LED depends on variation in manufacturing. Therefore, if such an LED is used for reading an image from an original, image characteristics of the read image depends on the LED. To address the above problem, for example, Japanese Patent Application Laid-open No. 2005-33834 discloses a conventional technology for performing various image processing on read image data.

However, the core technique of the conventional technology is to reduce effects due to variation in manufacturing of LEDs, and leaves other factors that may degrade precision of optical systems unresolved. In other words, demands for using reflected lights from originals with good precision, including improvement in image reading precision, are growing.

Specifically, because even the same type of LEDs emit lights with different optical wavelengths, even when originals in a color whose spectral characteristics is uniform are irradiated with lights from the same type of LEDs, electrical signal levels obtained by an optical-to-electrical (OE) conversion using reflected lights or transmitted lights from the originals (i.e., outputs from an image sensor) depend on a range of the variation in the optical wavelengths of the LEDs and effects of the spectral characteristics of the originals. As a result, quality of read images may be degraded.

SUMMARY OF THE INVENTION

It is an object of the present invention to at least partially solve the problems in the conventional technology.

According to one aspect of the present invention, there is provided an optical device including a light source unit that includes a light emitting element having spectral characteristics in a predetermined optical wavelength range from which a light is output to a scanning target; a photodetecting unit that includes a photodetecting element capable of detecting a light in the optical wavelength range and performs an optical-to-electrical conversion of either one of a reflected light and transmitted light from the scanning target detected by the photodetecting element; and a filter unit arranged in an optical path from the light emitting element to the photodetecting element via the scanning target and having an optical transmission range within the optical wavelength range of the spectral characteristics of the light emitting element and covering a range of variation in the optical wavelength range of the light emitting element.

Furthermore, according to another aspect of the present invention, there is provided an image reading device including an optical device that irradiates an original with a light, performs an optical-to-electrical conversion of either one of a reflected light and a transmitted light. The image reading device reads an image of the original by using an electrical signal output from the optical device. The optical device includes a light source unit that includes a light emitting element having spectral characteristics in a predetermined optical wavelength range from which a light is output to a scanning target; a photodetecting unit that includes a photodetecting element capable of detecting a light in the optical wavelength range and performs the optical-to-electrical conversion of either one of a reflected light and transmitted light from the scanning target detected by the photodetecting element; and a filter unit arranged in an optical path from the light emitting element to the photodetecting element via the scanning target and having an optical transmission range within the optical wavelength range of the spectral characteristics of the light emitting element and covering a range of variation in the optical wavelength range of the light emitting element.

Moreover, according to still another aspect of the present invention, there is provided a method of manufacturing a filter. The method includes measuring spectral characteristics of each of light emitting elements of same type having spectral characteristics in a predetermined optical wavelength range; irradiating an original having predetermined uniform spectral characteristics with a light from each of the light emitting elements; measuring output characteristics of a photodetecting element that detected a reflected light from the original; measuring a variation in an optical wavelength range of each of light emitting elements based on the spectral characteristics of each of the light emitting elements and the output characteristics of the photodetecting element; determining an optical transmission range such that the optical transmission range is within the optical wavelength range of each of the light emitting elements and covers a range of variation in each of the optical wavelength ranges of the light emitting elements; and manufacturing a filter having the optical transmission range determined at the determining.

The above and other objects, features, advantages and technical and industrial significance of this invention will be better understood by reading the following detailed descrip-

DETAILED DESCRIPTION OF THE PREFERRED EMBODIMENTS

Exemplary embodiments of the present invention are explained in detail below with reference to the accompanying drawings. In the description of the following embodiments, specific details are used merely as preferable examples. Therefore, the present invention is not to be limited to the following embodiments except when it is noted otherwise.

Figure 1:
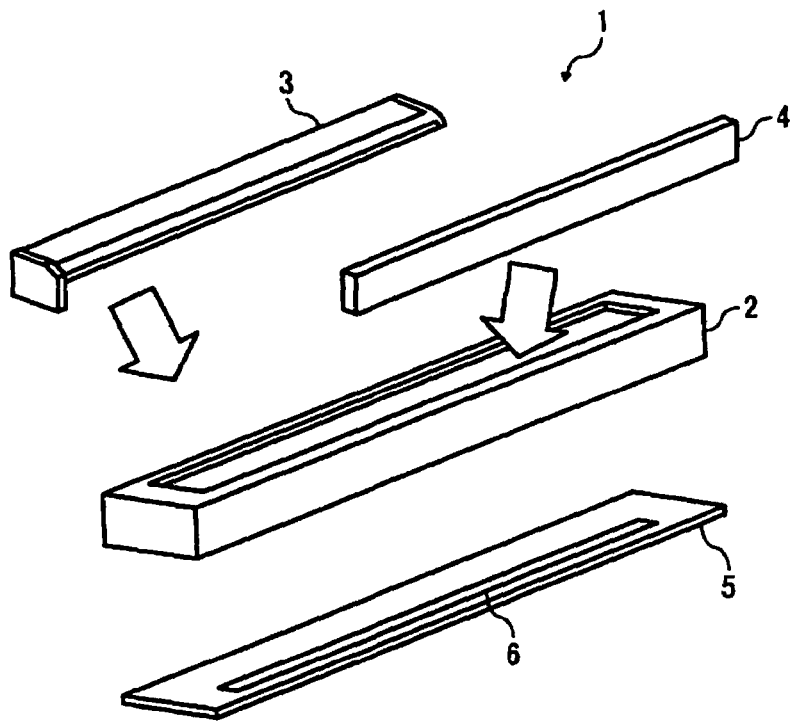
FIG. 1 is an exploded perspective view of an image sensor according to an embodiment of the present invention.

FIGS. 1 to 24 are diagrams for explaining an optical device and an image reading device according to an embodiment of the present invention. FIG. 1 is a perspective view of a configuration of an image sensor 1 to which the optical device and the image reading device according to the first embodiment is applied.

Figure 2:
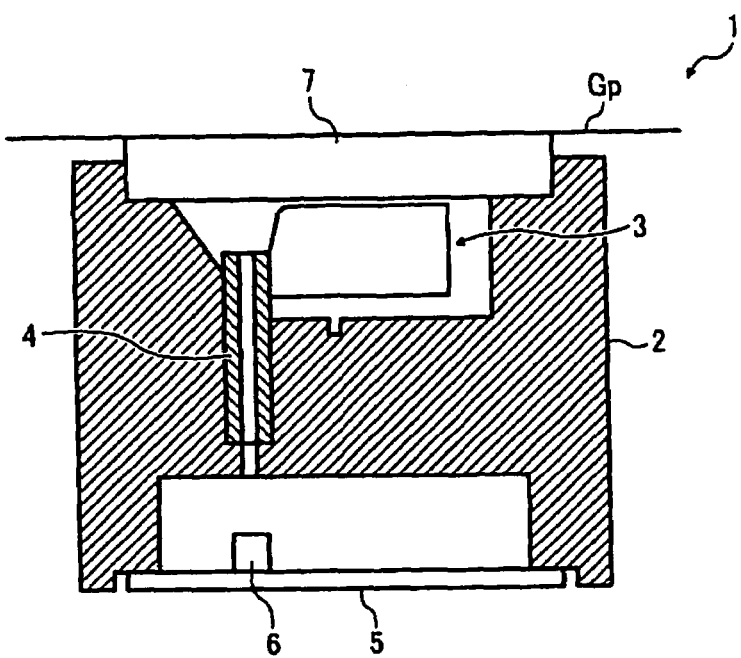
FIG. 2 is a sectional side view of the image sensor shown in FIG. 1.

As shown in FIGS. 1 and 2, the image sensor 1 includes a light source unit 3, a lens 4, and a photodetecting unit 5 in an optical housing 2. A top opening surface of the optical housing 2 is closed by a contact glass 7. The photodetecting unit 5 includes a CCD (Charge Coupled Device) array 6 as a photodetecting element. An original Gp to be irradiated with a light is placed on an outer surface of the contact glass 7. The image sensor 1 irradiates the original Gp with a light and outputs an electrical signal corresponding to the light intensity of the reflected light from the original Gp.

Figure 3:
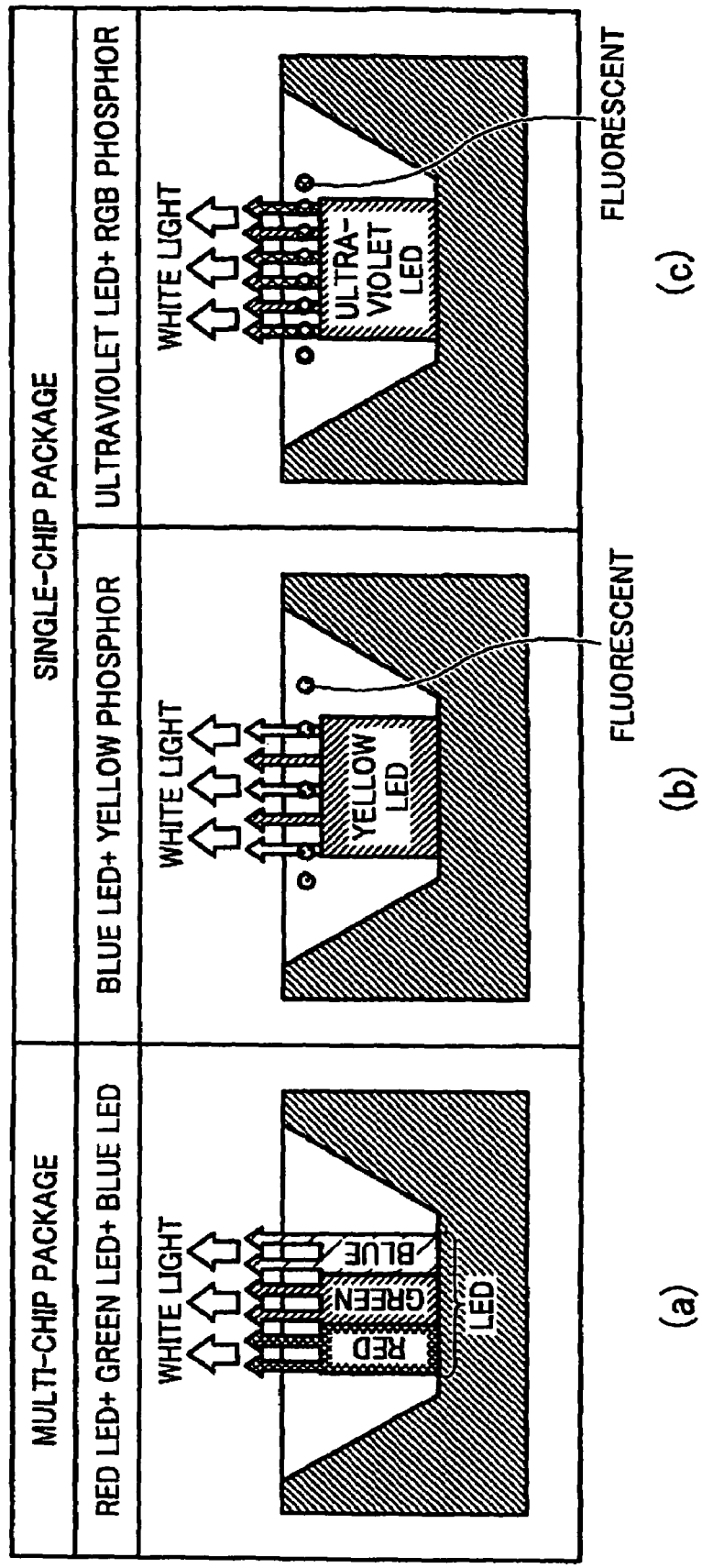
FIG. 3 is a diagram for explaining a configuration package of an LED in a light source unit of the image sensor shown in FIG. 1.

The light source unit 3 includes an LED (Light Emitting Diode) element as a light emitting element. As shown in FIG. 3, a configuration package of the LED can be either one of a multi-chip package and a single-chip package. The multi-chip package includes three LEDs, that is, a red LED, a green LED, and a blue LED, for all three primary colors as shown in (a) of FIG. 3. The single-chip package includes one LED, that is, a blue LED with a yellow phosphor as shown in (b) of FIG. 3, or a purple LED with an RGB phosphor as shown in (c) of FIG. 3.

Figure 4A:
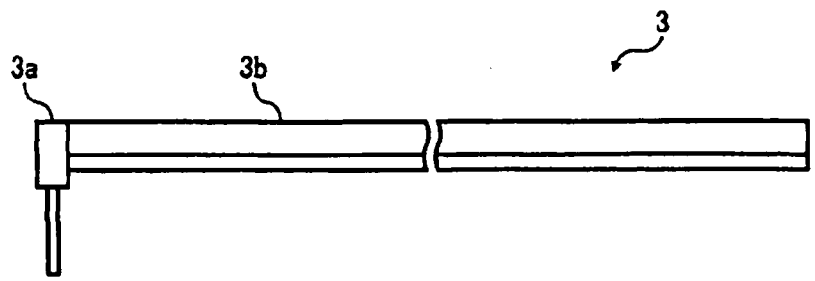
FIG. 4A is a front view of the light source unit of the image sensor shown in FIG. 1 when the light source unit includes a waveguide unit.
Figure 4B:
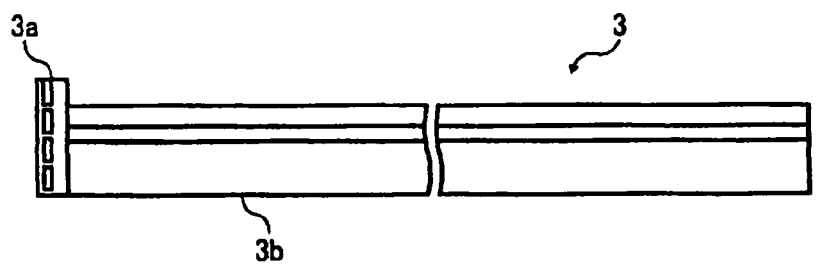
FIG. 4B is a top view of the light source unit shown in FIG. 4A.
Figure 5A:
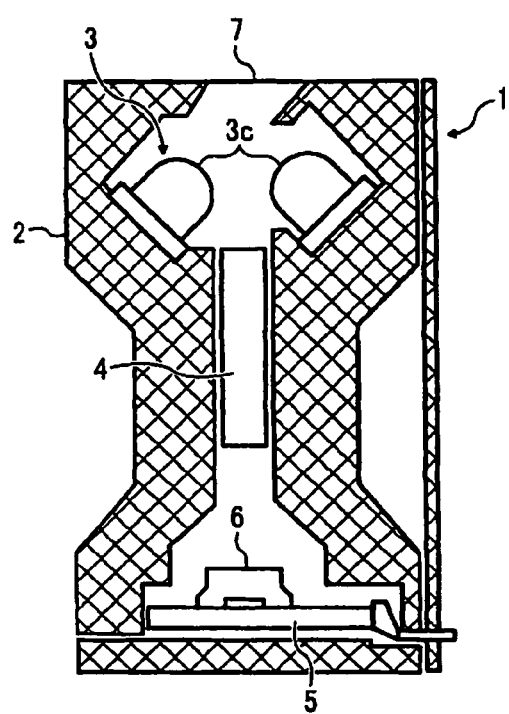
FIG. 5A is a schematic diagram of a dual-lamp configuration of the light source unit of the image sensor shown in FIG. 1 when the light source unit does not include a waveguide unit.
Figure 5B:
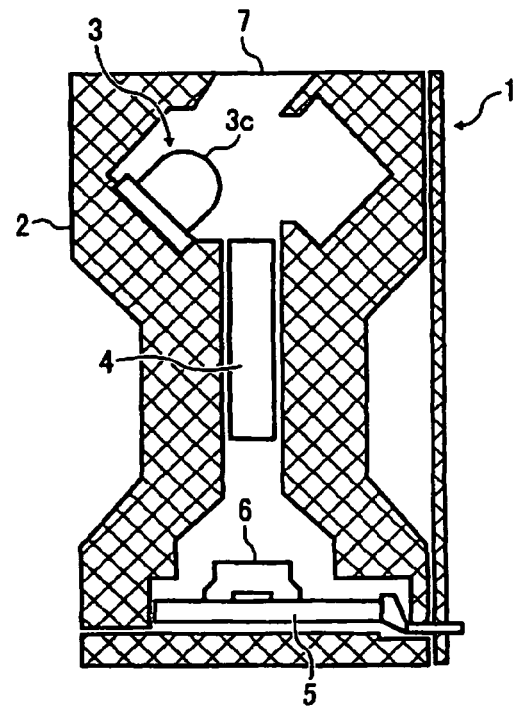
FIG. 5B is a schematic diagram of a single-lamp configuration of the light source unit of the image sensor shown in FIG. 1 when the light source unit does not include a waveguide unit.

As shown in FIGS. 4A and 4B, the light source unit 3 can include an LED device 3a and a waveguide unit 3b such that the waveguide unit 3b uniformly guides a light emitted from the LED device 3a in a longitudinal direction (a width direction of an original, i.e., a main-scanning direction) to irradiate the original Gp with the light. Alternatively, as shown in FIGS. 5A and 5B, the light source unit 3 can include an LED array 3c arranged along the width direction of an original, without a waveguide unit. The LED array 3c includes a plurality of LEDs arranged in a row in the width direction of an original. FIG. 5A is an example of a dual-lamp configuration, and FIG. 5B is an example of a single-lamp configuration.

Figure 6A:
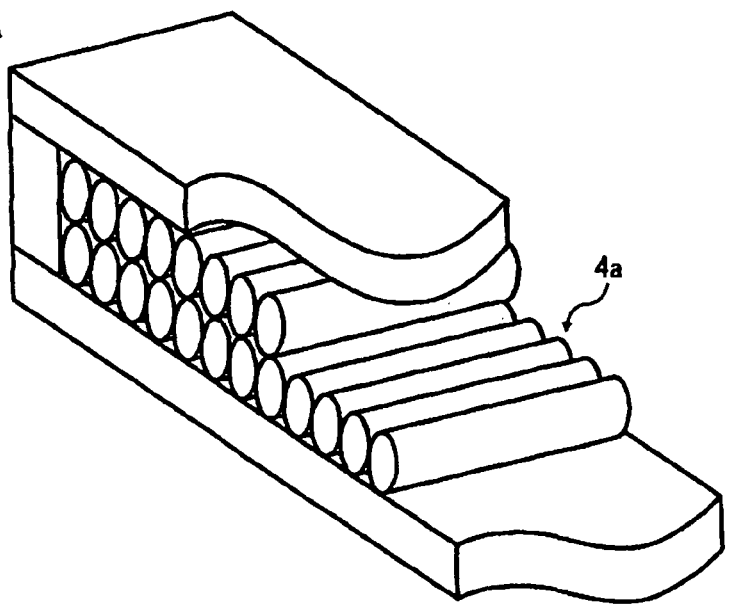
FIGS. 6A and 6B are perspective views of a SELFOC lens array employed as a lens of the image sensor shown in FIG. 1.
Figure 6B:
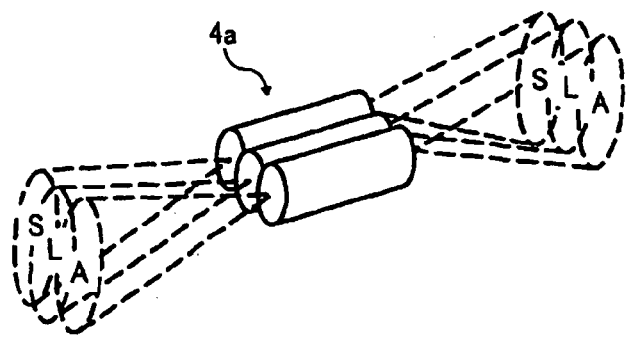
Figure 7:
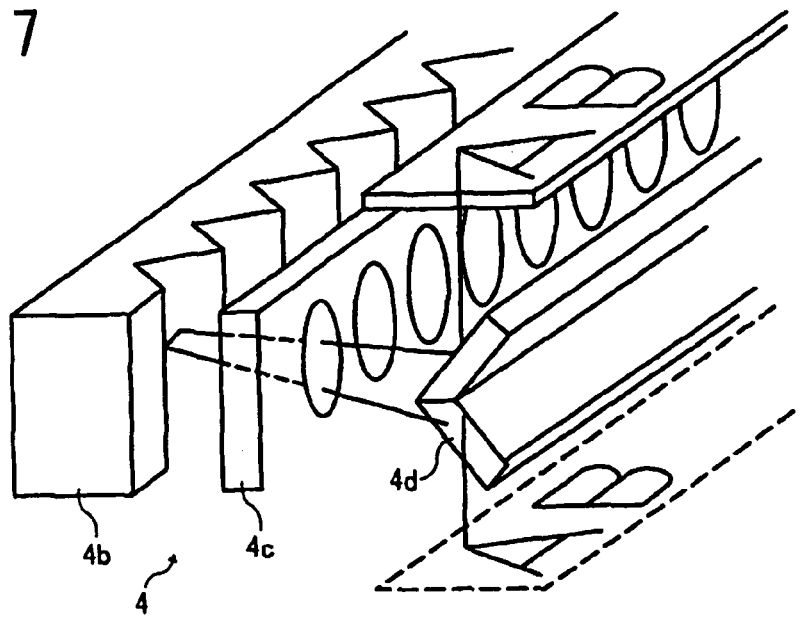
FIG. 7 is a perspective view of a roof mirror lens array, a lens array, and a separation mirror employed as a lens of the image sensor shown in FIG. 1.
Figure 8A:
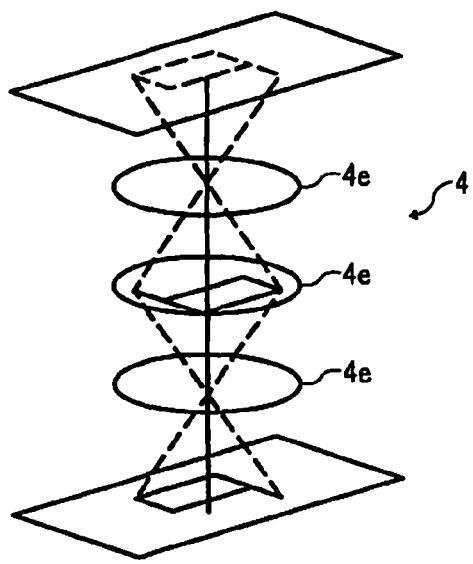
FIG. 8A is perspective view of a plate lens array employed as a lens of the image sensor shown in FIG. 1.
Figure 8B:
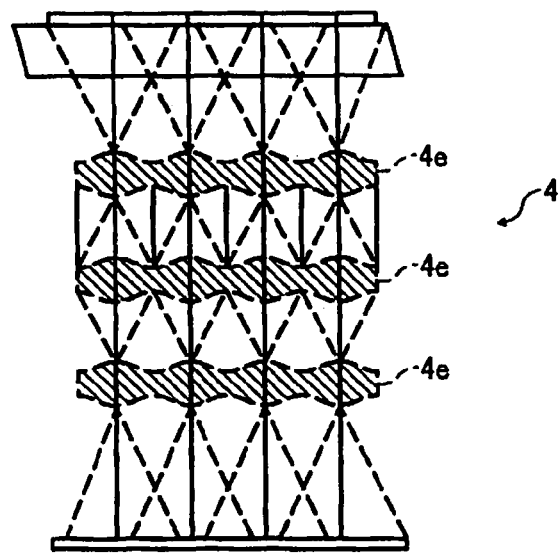
FIG. 8B is a front view of the plate lens array shown in FIG. 8A.
Figure 8C:
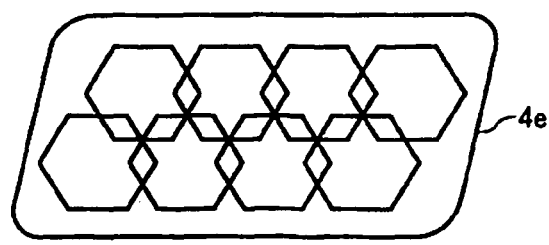
FIG. 8C is a top view of a plate lens in the plate lens array shown in FIG. 8A.
Figure 9:
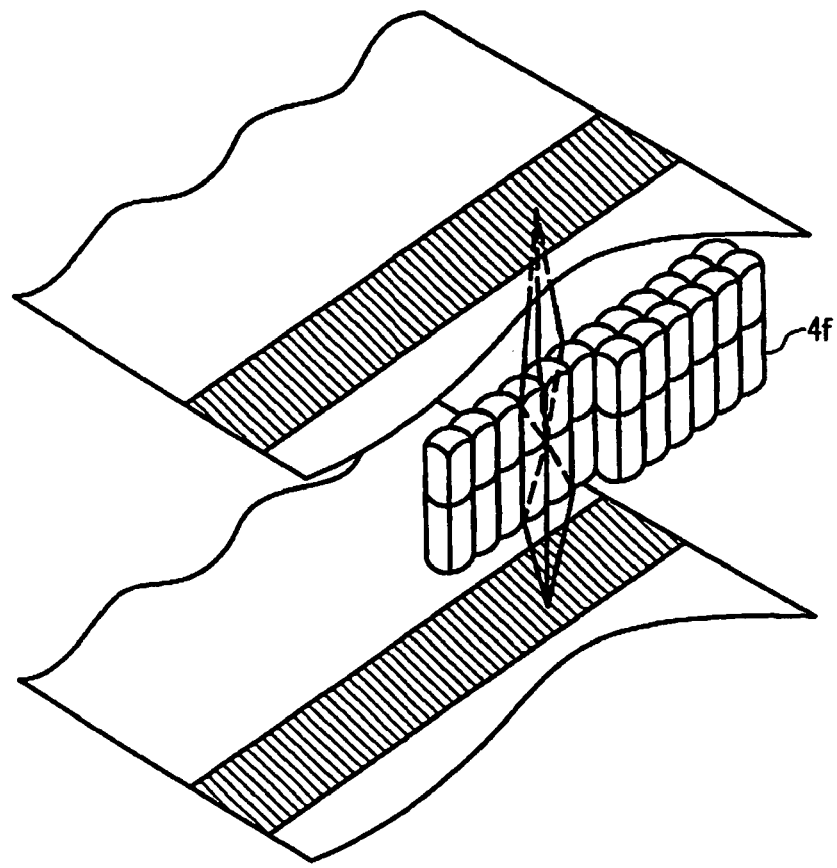
FIG. 9 is a perspective view of a telecentric lens array employed as a lens of the image sensor shown in FIG. 1.

The lens 4 can include any one of the followings: a SELFOC lens array 4a as shown in FIGS. 6A and 6B; a combination of a roof mirror lens array 4b, a lens array 4c, and a separation mirror 4d as shown in FIG. 7; a plate lens array 4e as shown in FIGS. 8A to 8C; and a telecentric lens array 4f as shown in FIG. 9.

Figure 10:
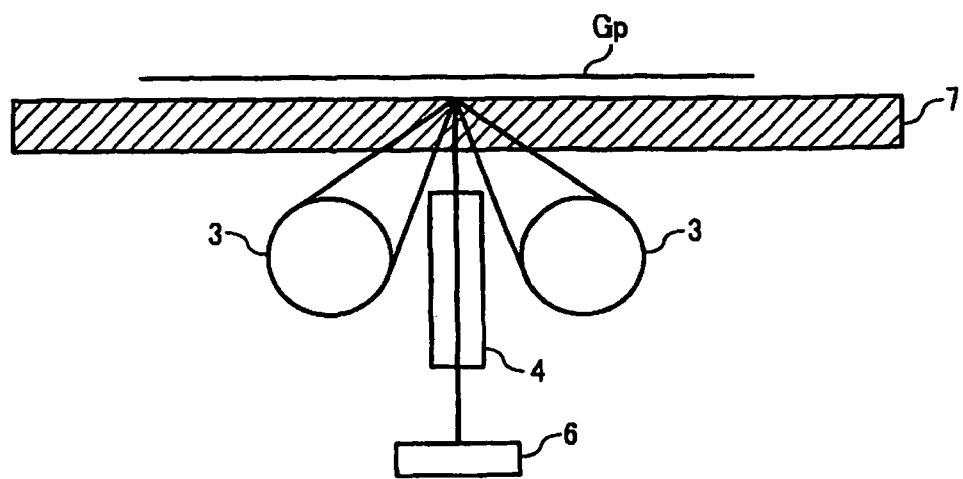
FIG. 10 is schematic diagram of a contact image sensor according to the embodiment.

In the above description, the image sensor 1 is assumed as a unity magnification image sensor and a single-line sensor as shown in FIG. 10. However, the image sensor 1 can be a multi-line sensor.

Figure 11:
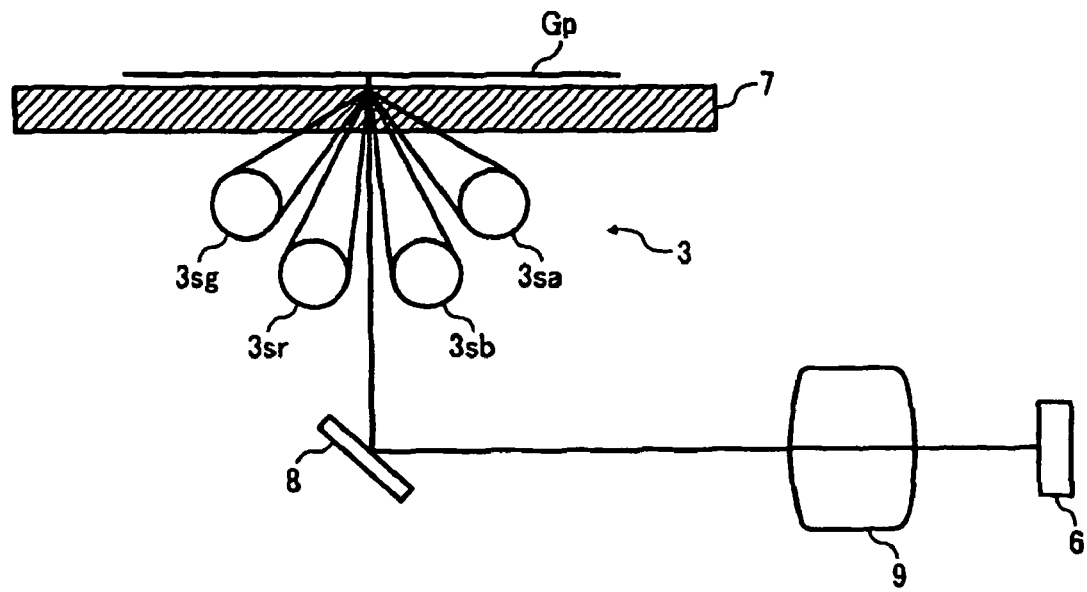
FIG. 11 is a schematic diagram of a reduction-type image sensor according to the embodiment.

Furthermore, as shown in FIG. 11, the image sensor 1 can be a reduction-type image sensor that employs an optical system for forming a reduced image, instead of the unity magnification image sensor. In the example shown in FIG. 11, the light source unit 3 includes LEDs 3sr, 3sg, and 3sb for RGB, and the reflected light from the original Gp via the contact glass 7 is reflected by a mirror 8 and then input into the CCD array 6 via a lens 9.

Figure 12:
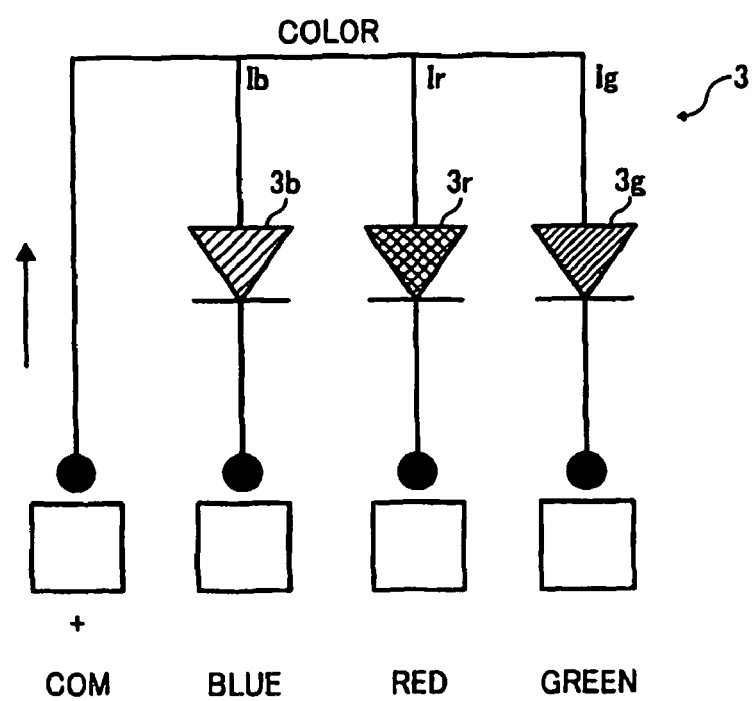
FIG. 12 is a schematic diagram for explaining operations of LEDs for RGB in the image sensor shown in FIG. 1.

As shown in FIG. 12, when the light source unit 3 employs the multi-chip package including LEDs 3r, 3g, and 3b for RGB, drive currents Ir, Ig, and Ib are applied to the LEDs 3r, 3g, and 3b, respectively. At this state, as shown in FIG. 13, the drive currents Ir, Ig, and Ib are applied at different timings.

Figure 13:
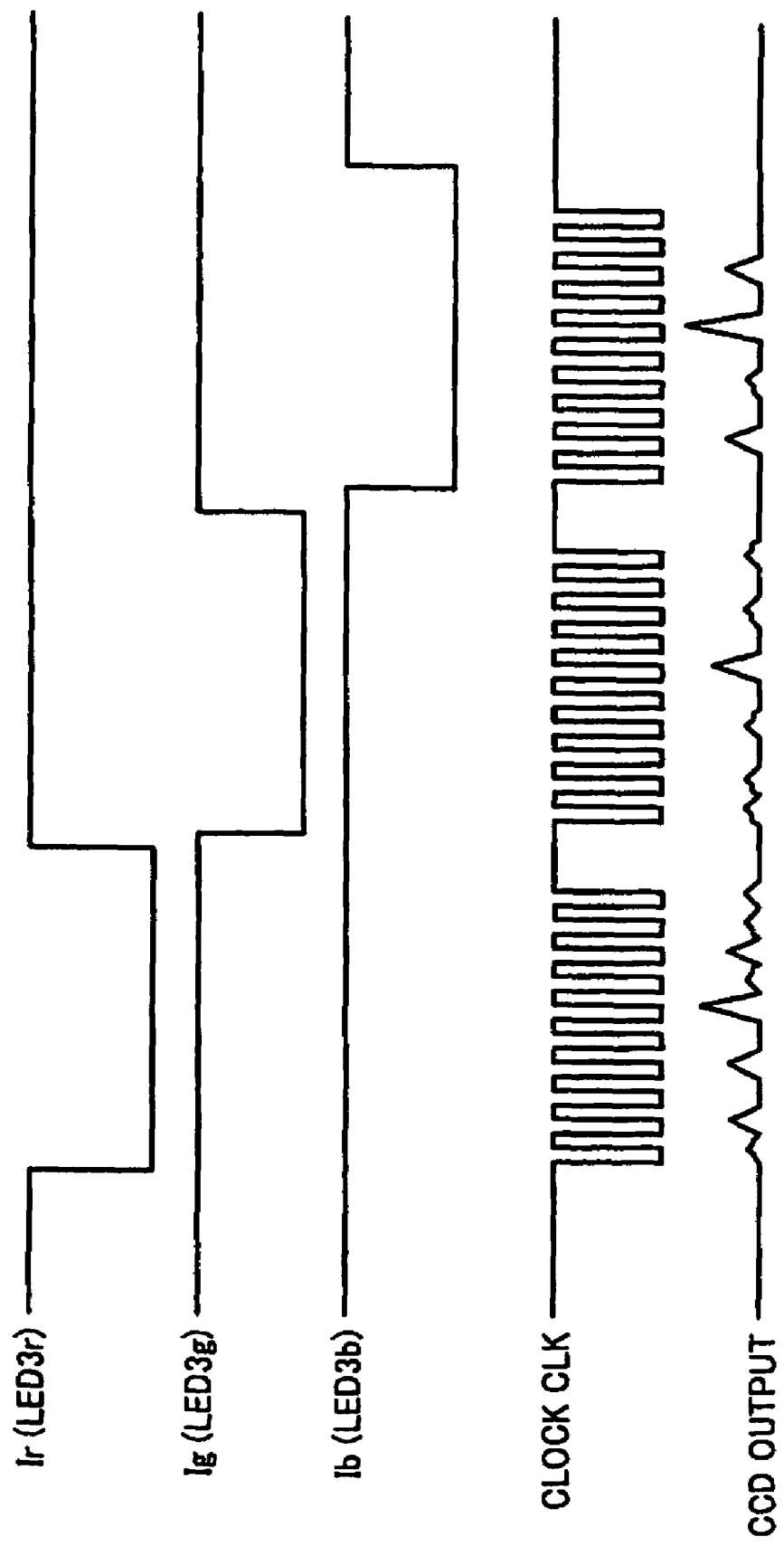
FIG. 13 is a timing diagram of driving timings of LEDs for RGB, output clock, and CCD output in the image sensor shown in FIG. 1.

In the image sensor 1, the LEDs 3r, 3g, and 3b are sequentially driven by applying the drive currents Ir, Ig, and Ib at different timings as shown in FIG. 13 and thereby the LEDs 3r, 3g, and 3b emit lights. The lights emitted from the LEDs 3r, 3g, and 3b at different timings are applied as reading lights to the original Gp via the contact glass 7, and the reflected light from the original Gp is input into the CCD array 6 of the photodetecting unit 5 via the lens 4.

The CCD array 6 outputs, as a CCD output, an electrical signal based on electric charges proportional to the light intensity of the reflected light from the original Gp.

The image sensor 1 can be applied to an image reading device such as a facsimile device, a copier, a multifunction peripheral, and a scanner device. The output from the CCD array 6 is subjected to analog-to-digital conversion by an analog front end unit (not shown) and then input into an image input unit 21 of an image processing unit 20 shown in FIG. 14.

Figure 14:
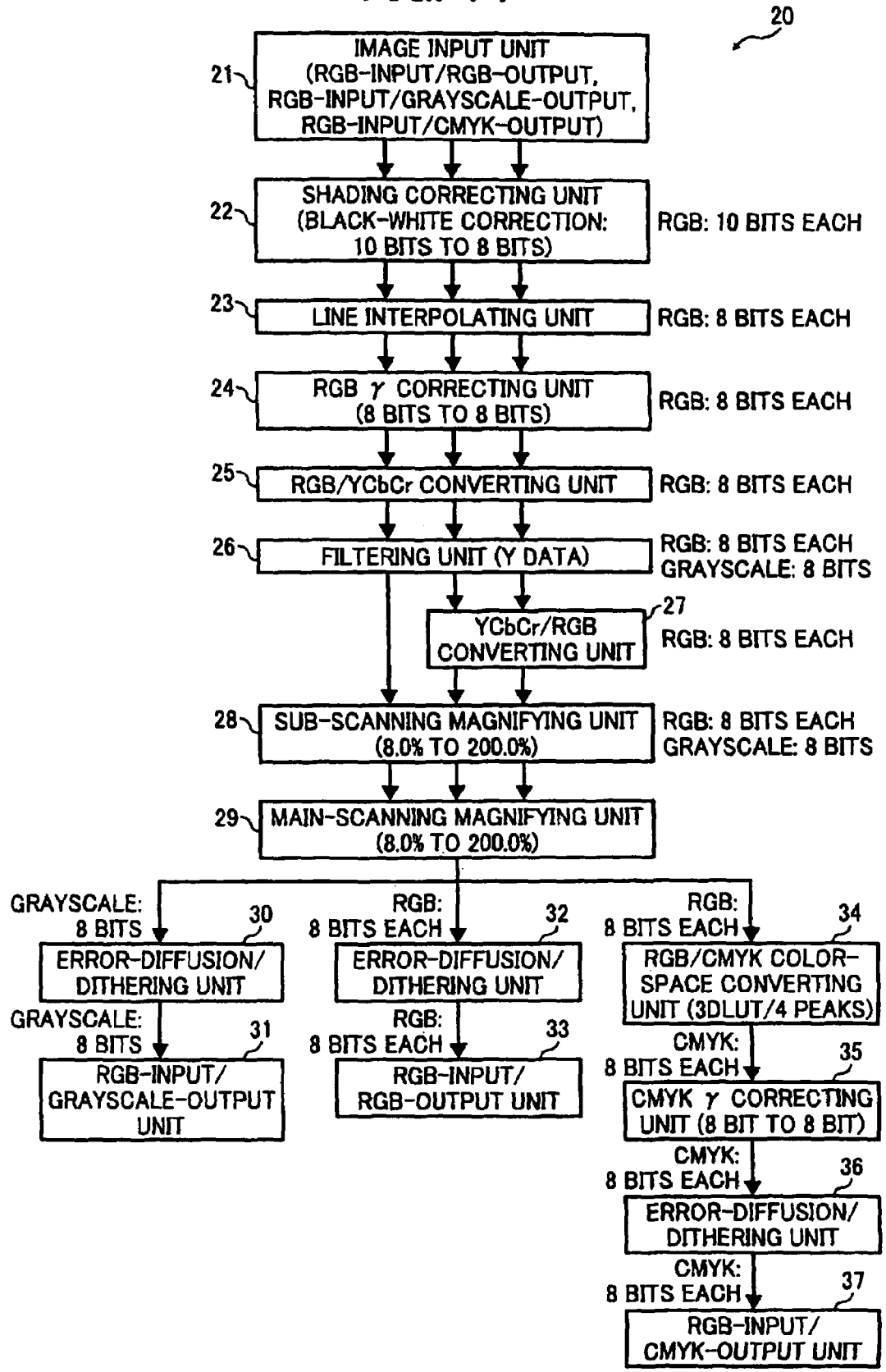
FIG. 14 is a block diagram of an image processing unit that processes image data to be output from the image sensor shown in FIG. 1.

The image processing unit 20 includes, as shown in FIG. 14, the image input unit 21, a shading correcting unit 22, a line interpolating unit 23, an RGB γ correcting unit 24, an RGB/YCbCr converting unit 25, a filtering unit 26, an YCbCr/RGB converting unit 27, a sub-scanning magnifying unit 28, a main-scanning magnifying unit 29, an error-diffusion/dithering unit 30, an RGB-input/grayscale-output unit 31, an error-diffusion/dithering unit 32, an RGB-input/RGB-output unit 33, an RGB/CMYK color-space converting unit 34, a CMYK γ correcting unit 35, an error-diffusion/dithering unit 36, and an RGB-input/CMYK-output unit 37. Thus, image processing lines corresponding to grayscale output, RGB output, and CMYK output are provided for an RGB image input from the image sensor 1.

The image processing unit 20 inputs RGB image data received from the image sensor 1 to the shading correcting unit 22. The shading correcting unit 22 corrects variation in light intensity distribution of the light source unit 3 in the main-scanning direction and variation in image signal level in the main-scanning direction due to characteristics of outputs from the CCD array 6 to an A/D converting unit (not shown), and then outputs the corrected data to the line interpolating unit 23. The line interpolating unit 23 corrects positional shift between lines at the same magnification in each of signals for RGB output from the CCD array 6 of the image sensor 1, and then outputs the corrected data to the RGB γ correcting unit 24. The RGB γ correcting unit 24 converts RGB reflectance data into RGB density data, and then outputs the converted data to the RGB/YCbCr converting unit 25.

The RGB/YCbCr converting unit 25 converts RGB image data into YCbCr image data, and then outputs the converted data to the filtering unit 26. The filtering unit 26 performs a filtering process on Y data, outputs grayscale image data to the sub-scanning magnifying unit 28, and outputs color image data to the YCbCr/RGB converting unit 27.

The YCbCr/RGB converting unit 27 converts YCbCr image data into RGB image data, and then outputs the converted data to the sub-scanning magnifying unit 28.

The sub-scanning magnifying unit 28 changes magnification of image data in the sub-scanning direction within a predetermined range, for example, from 8.0% to 200.0%, and then outputs the image data to the main-scanning magnifying unit 29. The main-scanning magnifying unit 29 changes magnification of image data in the main-scanning direction within a predetermined range, for example, from 8.0% to 200.0%, and then outputs grayscale image data to the error-diffusion/dithering unit 30, RGB image data to the error-diffusion/dithering unit 32 or the RGB/CMYK color-space converting unit 34.

The error-diffusion/dithering unit 30 performs a gradation process on the grayscale image data by error diffusion or dithering, and then outputs the grayscale image data to the RGB-input/grayscale-output unit 31. The RGB-input/grayscale-output unit 31 outputs the 8-bit grayscale image data received from the error-diffusion/dithering unit 30.

The error-diffusion/dithering unit 32 performs a gradation process by error diffusion or dithering on the RGB image data received from the main-scanning magnifying unit 29, and then outputs the RGB image data to the RGB-input/RGB-output unit 33. The RGB-input/RGB-output unit 33 supplies the RGB image data received from the error-diffusion/dithering unit 32 to an image memory, or outputs the RGB image data to an image processing apparatus such as a computer or an image forming apparatus.

The RGB/CMYK color-space converting unit 34 converts the RGB image data received from the main-scanning magnifying unit 29 into CMYK image data, and then outputs the CMYK image data to the CMYK γ correcting unit 35. The CMYK γ correcting unit 35 performs γ correction on the CMYK image data, and outputs the CMYK image data to the error-diffusion/dithering unit 36.

The error-diffusion/dithering unit 36 performs a gradation process by error diffusion or dithering on the CMYK image data received from the CMYK γ correcting unit 35, and then outputs the CMYK image data to the RGB-input/CMYK-output unit 37. The RGB-input/CMYK-output unit 37 outputs the CMYK image data received from the error-diffusion/dithering unit 32 to a printer or the like to make a printout by the printer or the like.

In this manner, the image sensor 1 is configured such that the LED device 3a of the light source unit 3 emits a light to irradiate the original Gp with the light via the contact glass 7, and the reflected light from the original Gp is input into the CCD array 6 via the lens 4. With this configuration, a filter (not shown) is placed in an optical path from the LED device 3a to the CCD array 6. The filter has an optical wavelength range that covers a range of variation in an optical wavelength range of spectral characteristics of an LED, and an optical transmission range within the optical wavelength range of the spectral characteristics of the LED. If the LED device 3a employs the multi-chip package in which the LEDs 3r, 3g, and 3b for RGB are arranged as shown in (a) of FIG. 3 and FIG. 12, a filter having the above optical transmission range is placed for each of the LEDs 3r, 3g, and 3b with respect to the optical wavelength ranges of the LEDs 3r, 3g, and 3b. If the LED device 3a employs the single-chip package as shown in (b) and (c) of FIG. 3, a filter having the above optical transmission range is placed for a LED with respect to an optical wavelength range of the LED.

The filter can be placed in an optical path from an LED of the light source unit 3 to the original Gp, e.g., in the light source unit 3. Alternatively, the filter can be placed in an optical path from the original Gp to the CCD array 6, e.g., on the lens 4 or on a preceding stage of the CCD array 6. If the filter is placed in the light source unit 3 that includes the waveguide unit 3b, the filter can be placed on an irradiating member of the waveguide unit 3b. By placing the filter on the irradiating member, the area of the filter can be small.

An operation according to the first embodiment is described below. By arranging the filter having the optical wavelength range that covers the range of the variation in the optical wavelength range of the spectral characteristics of the LED, and the optical transmission range within the optical wavelength range of the spectral characteristics of the LED, in the optical path from the LED device 3a to the CCD array 6, the image sensor 1 can suppress effects of the optical characteristics of the LED and the original Gp to be irradiated with a light. Thus, availability of a reflected light from the original Gp can be enhanced.

Figure 15:
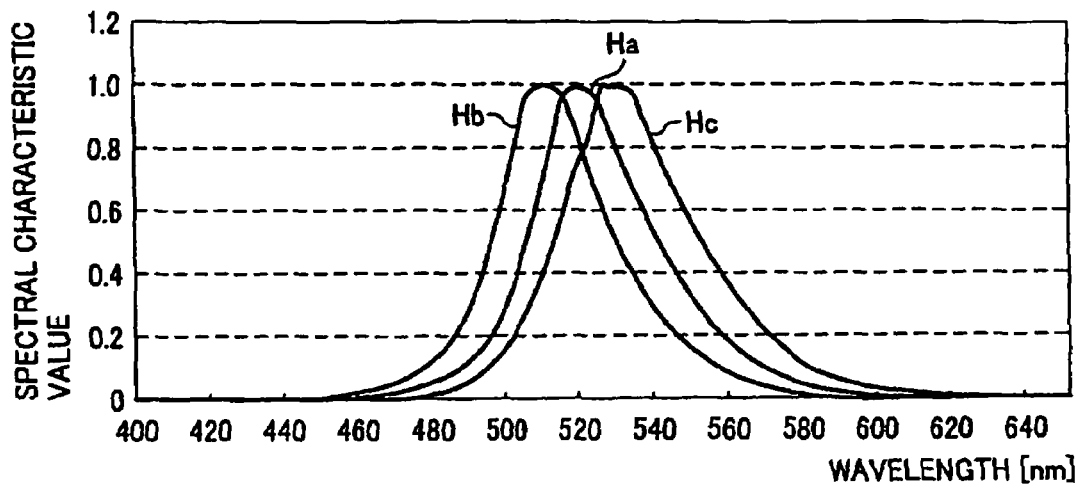
FIG. 15 is a graph illustrating variation in spectral characteristics of LEDs.

Specifically, as shown in FIG. 15, optical wavelength ranges of the spectral characteristics of LEDs are not uniform due to variation in manufacturing. That is, in the example shown in FIG. 15, spectral characteristic curves Hb and Hc are shifted with respect to a spectral characteristic curve Ha. In this graph, an X-axis represents a wavelength (nanometers) and a Y-axis represents a spectral characteristic value. The spectral characteristic curves Ha to Hc are normalized by an integrated value based on assumption that black correction and white correction are performed by the shading correcting unit 22 of the image processing unit 20.

Figure 16:
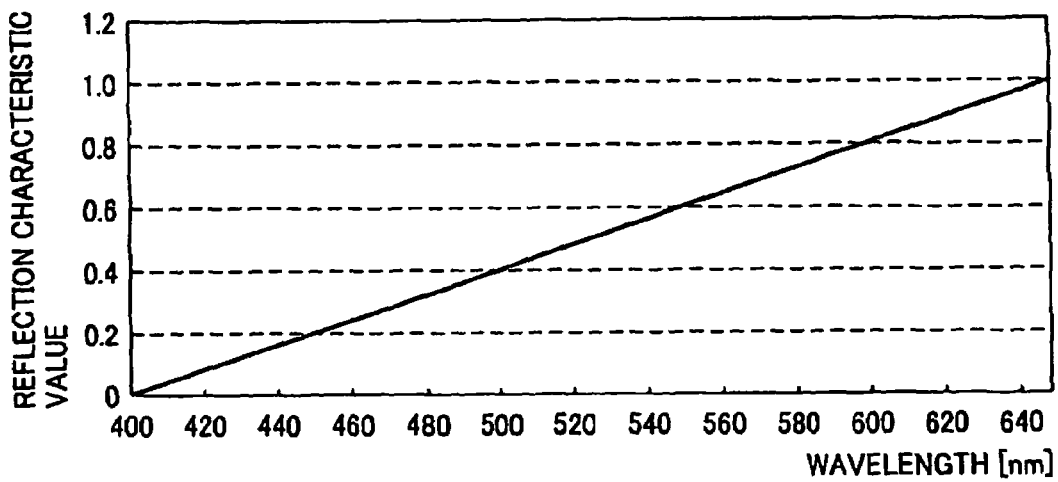
FIG. 16 is a graph of an example of reflection characteristics of an original.

When the image sensor 1 that irradiates a target object with a light and uses the reflected light from the target object is applied to, for example, an image reading device, the optical wavelength range of the spectral characteristics of the LED depends as described above. Meanwhile, as shown in FIG. 16, reflection characteristics of the target object (the original Gp) may vary at least in the optical wavelength range of the spectral characteristics of the LED. In the graph shown in FIG. 16, an X-axis represents a wavelength (nanometers) and a Y-axis represents a reflection characteristic value of the original Gp.

Figure 17:
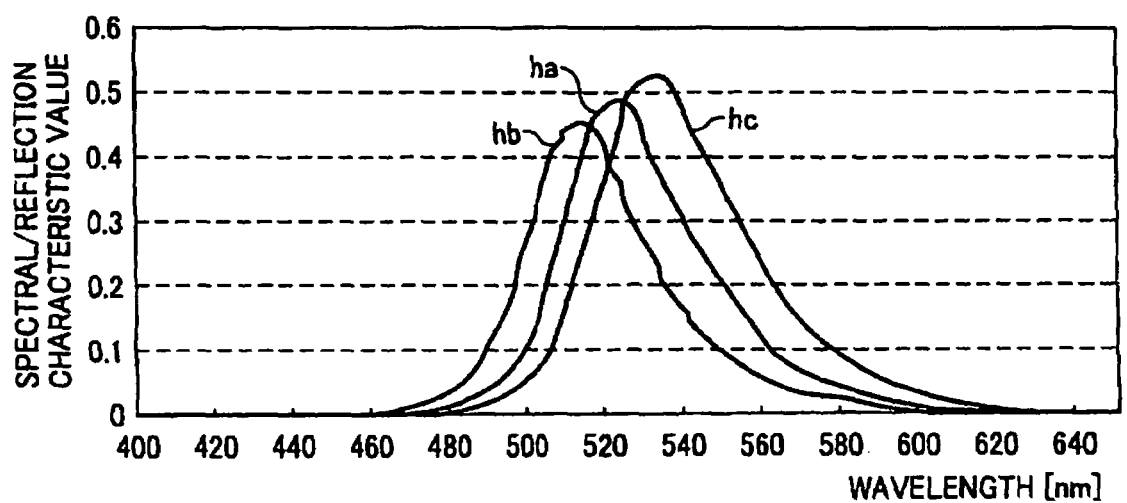
FIG. 17 is a graph of spectral/reflection characteristics of reflected lights that are obtained when the original having the reflection characteristics shown in FIG. 17 is irradiated with lights from the LEDs having the spectral characteristics shown in FIG. 15.

If the original Gp having the reflection characteristics shown in FIG. 16 is irradiated with each of lights from the LEDs having the spectral characteristics as shown in FIG. 15, spectral/reflection characteristics of a surface of the original Gp corresponds to each of characteristic curves ha, hb, and hc shown in FIG. 17. Each of the characteristic curves ha, hb, and hc is obtained by multiplication of each of the spectral characteristics of the LEDs and the reflection characteristics of the original Gp.

Figure 18:
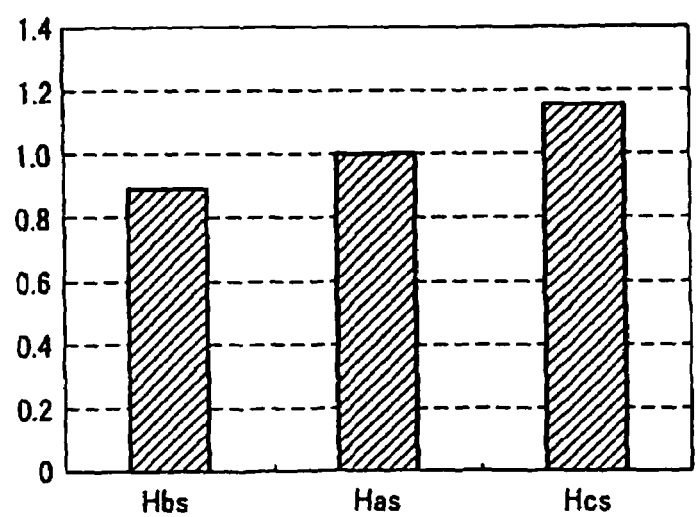
FIG. 18 is a graph of output characteristics obtained when the reflected lights having the spectral/reflection characteristics shown in FIG. 17 are subjected to OE conversion by a CCD array shown in FIG. 1.

Subsequently, assuming that the lights having the spectral characteristics shown in FIG. 15 are reflected from the original Gp having the reflection characteristics shown in FIG. 16, and the reflected lights are applied to the photodetecting unit 5 and then subjected to OE conversion by the CCD array 6 whose photodetecting sensitivity is substantially uniform. Then, as shown in FIG. 18, outputs from the CCD array 6 (CCD array outputs) Has, Hbs, and Hcs corresponding to the lights having the spectral characteristic curves Ha, Hb, and Hc of the LED, respectively, become proportional to integrated values of the characteristic curves ha, hb, and hc of the LED shown in FIG. 17. The CCD array outputs Has, Hbs, and Hcs shown in FIG. 18 are normalized integrated values of the characteristic curves ha, hb, and hc based on assumption that the integrated value Has of the characteristic curve ha is normalized to 1.

Thus, even when the LED array 3c for the same color is used, if an emission wavelength of the LED array 3c is not uniform, level of outputs from the CCD array 6 varies. Therefore, quality of a read image from the original Gp is degraded and thereby usability of the image sensor 1 is degraded.

The above problem occurs due to variation in the optical wavelength range of the spectral characteristics of the LED and variation in the reflection characteristics of the original Gp. Therefore, if the optical wavelength ranges of the spectral characteristics of LEDs are made uniform, such problem hardly occurs. Generally, LEDs are ranked such that LEDs with less variation are ranked high. Therefore, if an LED with less variation is to be selected for the image sensor 1, the rank of the required LED increases. As the rank of the LED increases, its cost also increases. Furthermore, if LEDs for a plurality of colors are installed in the LED device 3a of the light source unit 3, ranks of the LEDs need to be the same. Therefore, as the number of colors for the LEDs increases, required costs for the image sensor 1 exponentially increase.

In the image sensor 1, the filter having the optical wavelength range that covers the range of variation in the optical wavelength range of the spectral characteristics of the LED, and the optical transmission range within the optical wavelength range of the spectral characteristics of the LED is placed in the optical path from the LED device 3a to the CCD array 6. For example, when the LED of the LED device 3a has the spectral characteristics over the optical wavelength range whose center is at about 520 nanometers as shown in FIG. 15, a filter having the optical transmission range over an optical wavelength range from 500 nanometers to 550 nanometers as shown in FIG. 19 is used.

Figure 19:
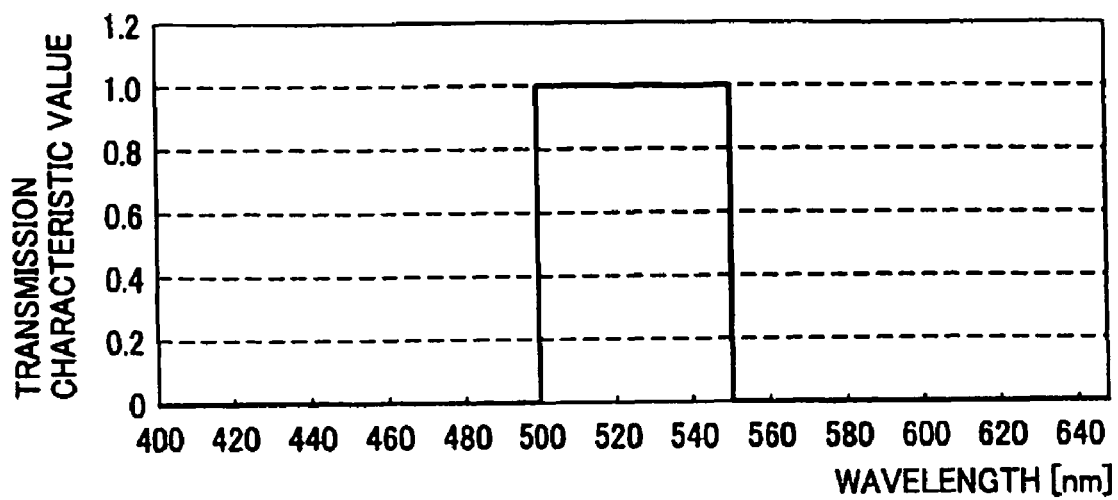
FIG. 19 is a graph of transmission characteristics of a filter placed for the LEDs having the spectral characteristics shown in FIG. 15 in the image sensor shown in FIG. 1.
Figure 20:
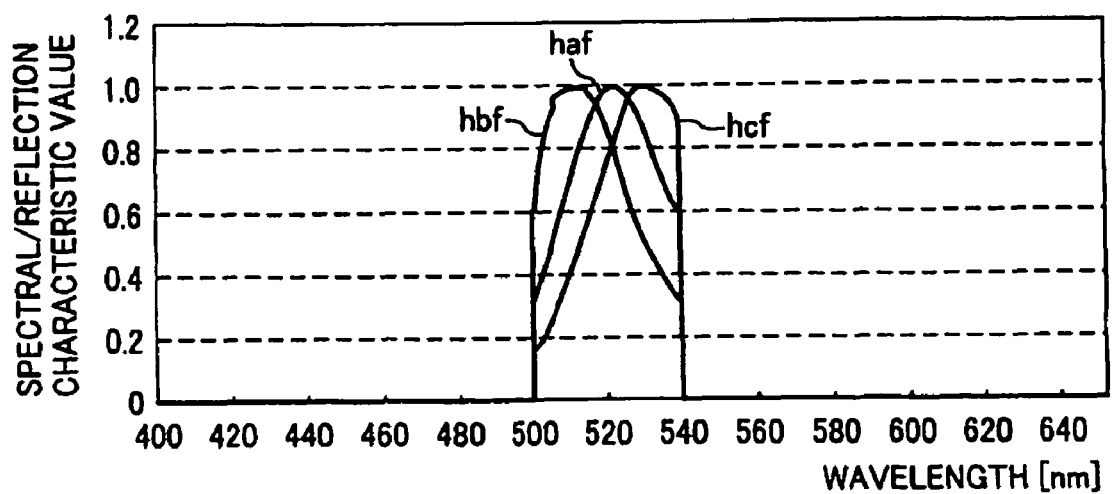
FIG. 20 is a graph of spectral/transmission characteristics obtained when the lights from the LEDs having the spectral characteristics shown in FIG. 15 pass through the filter having the transmission characteristics shown in FIG. 19.

Assuming that the spectral characteristics of the LED of the LED device 3a corresponds to each of those shown in FIG. 15 and the filter having the optical transmission range in the optical wavelength range as shown in FIG. 19 is placed in the optical path from the light source unit 3 to the original Gp. Then, as shown in FIG. 20, spectral/reflection characteristics obtained when the light from the LED having each of the spectral characteristics passes through the filter corresponds to each of spectral transmission characteristic curves haf, hbf, and hcf. Each of the spectral transmission characteristic curves haf, hbf, and hcf is obtained by multiplication of each of the spectral characteristic values (characteristic curves) ha, hb, and hc of the LED array 3c and a transmission characteristic value of the filter (in the example shown in FIG. 19, it is assumed that the transmission characteristic value is set to 1).

Figure 21:
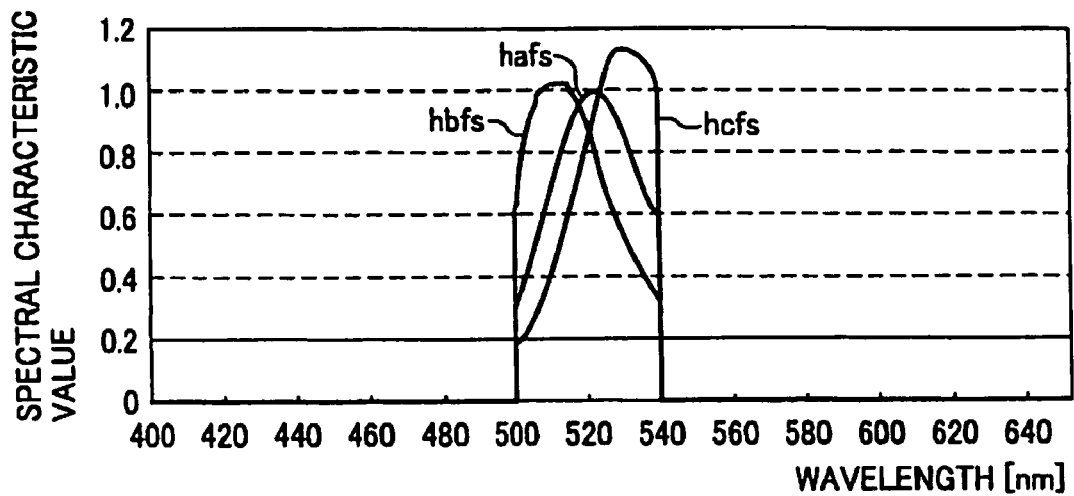
FIG. 21 is a graph of spectral/transmission/black-white correction characteristics obtained based on assumption that black and white correction are performed on the lights having the spectral/transmission characteristics shown in FIG. 20.

Assuming that black correction and white correction are performed by the shading correcting unit 22 on outputs from the CCD array 6 using the lights corresponding to the spectral transmission characteristic curves haf, hbf, and hcf. Then, spectral/transmission/black-white correction characteristic curves hafs, hbfs, and hcfs as shown in FIG. 21 are obtained.

Figure 22:
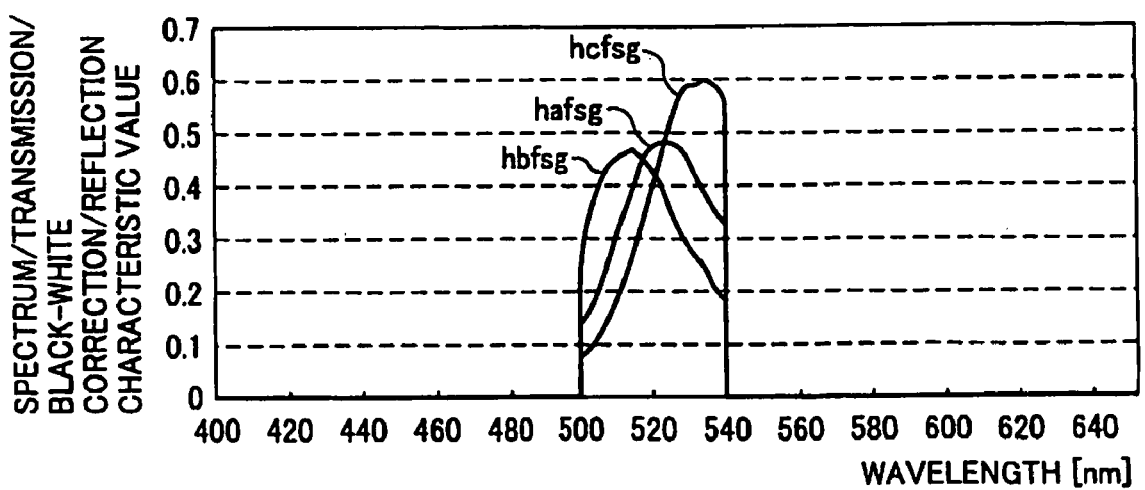
FIG. 22 is a graph of spectral/transmission/black-white correction/reflection characteristics of reflected lights that are obtained when the original having the reflection characteristics shown in FIG. 16 is irradiated with the lights having the spectral/transmission/black-white correction characteristics shown in FIG. 21.

Subsequently, assuming that the lights, which are corresponding to both the spectral transmission characteristic curves haf, hbf, and hcf and the spectral/transmission/black-white characteristic curves hafs, hbfs, and hcfs based on black and white correction, are applied to the original Gp having the reflection characteristics as shown in FIG. 16, and the reflected lights from the original Gp are input into the CCD array 6 and subjected to black correction and white correction by the shading correcting unit 22. Then, as shown in FIG. 22, characteristic values (spectral/transmission/black-white correction/reflection characteristic values) of the lights input into the CCD array 6 correspond to spectral/transmission/black-white correction/reflection characteristic curves hafsg, hbfsg, and hcfsg. Each of the curves hafsg, hbfsg, and hcfsg is obtained by multiplication of each of the spectral characteristic values of the LED, the optical transmission characteristic value of the filter, and the reflection characteristic value of the original Gp.

Figure 23:
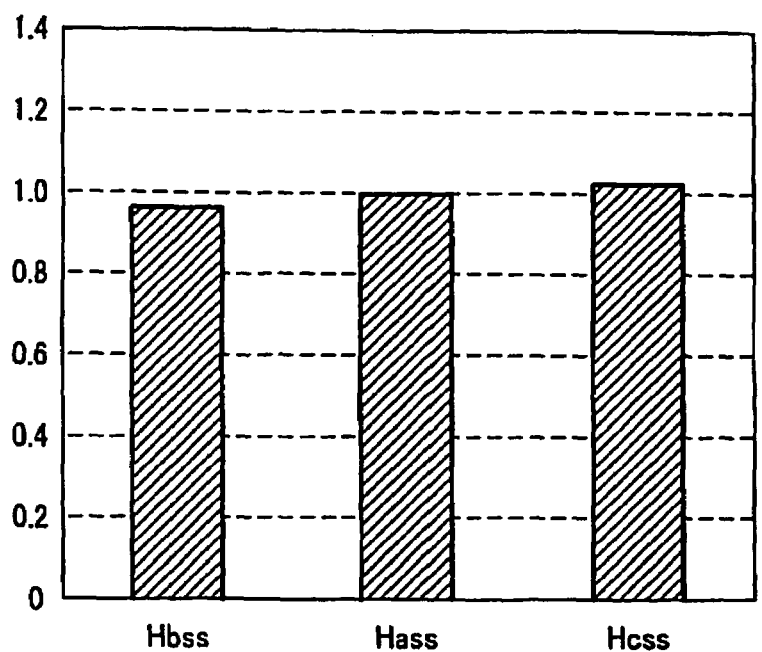
FIG. 23 is a graph of output characteristics obtained when the lights having the spectral/transmission/black-white correction/reflection characteristics shown in FIG. 22 are subjected to OE conversion by the CCD array shown in FIG. 1.

Consequently, as shown in FIG. 23, outputs from the CCD array 6 (CCD array outputs) Hass, Hbss, and Hcss become proportional to the integrated values of the spectral/transmission/black-white correction characteristic curves hafs, hbfs, and hcfs of the LEDs, respectively. As a result, compared to the example described in connection with FIG. 15, variation in the outputs Haas, Hbss, and Hccs, which are output from the CCD array 6, can be suppressed even when the spectral characteristics of the LEDs are not uniform. The values shown in FIG. 23 are normalized integrated values of the characteristic curves hafs, hbfs and hcfs based on assumption that an integrated value of the characteristic curve hafs is normalized to 1.

In the above description, it is assumed that the original Gp is a positive print and a light from the LED is reflected by the original Gp. However, a target object to be irradiated with a light is not limited to a positive print. For example, a negative print such as a negative film can be used. For the negative print, it is preferable to have a configuration in which the photodetecting unit 5 is arranged at a position opposite to the light source unit 3 so that a light from the light source unit 3 is transmitted through the target object and then received by the CCD array 6. In such a configuration, the above-described filter can be placed in an optical path from the LED of the light source unit 3 to the CCD array 6.

As described above, the image sensor 1 includes the filter having the optical transmission range within the optical wavelength range of the spectral characteristics of the LED, in the optical path through which a light travels from the LED of the light source unit 3 to the CCD array 6 via a target object, that is, through which a light emitted from the LED travels to the target object and then the reflected light or the transmitted light from the target object travels to the CCD array 6.

Thus, even when the optical wavelength range of the spectral characteristics of the LED is not uniform or the reflection characteristics and the transmission characteristics of the target object vary, effects due to the variation in the optical wavelength range, the reflection characteristics, and the transmission characteristics can be compensated by using the filter having the optical transmission characteristics within the optical wavelength range of the spectral characteristics of the LED. Thus, availability of the outputs from the CCD array 6 can be enhanced.

Figure 24:
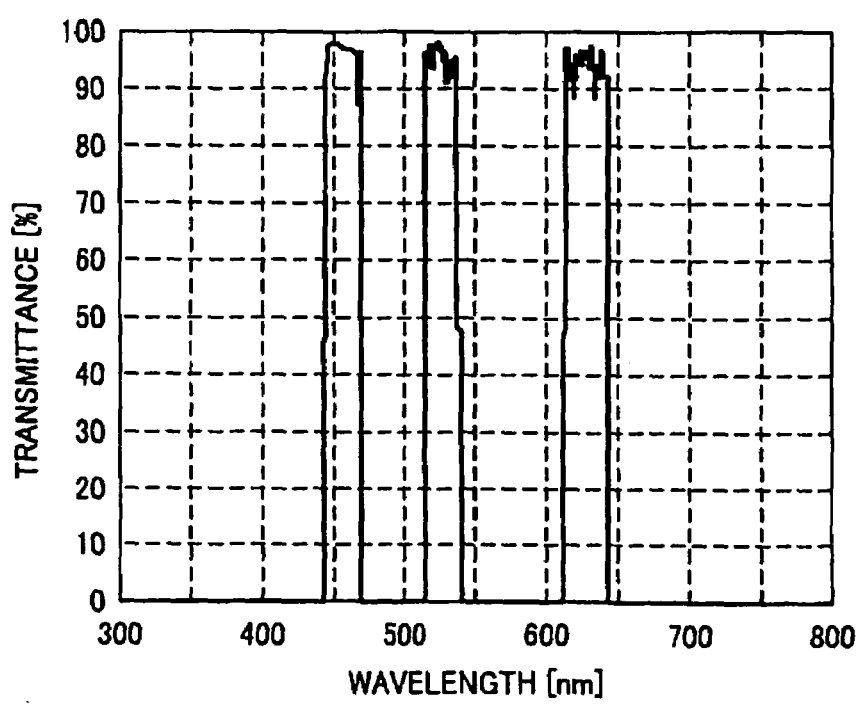
FIG. 24 is a graph of transmission characteristics of another filter according to the embodiment.

If the LED device 3a of the light source unit 3 employs the multi-chip package including the LEDs 3r, 3g, and 3b, the filter can be a multi bandpass filter or a triple bandpass filter having the optical transmission characteristics (transmittance) as shown in FIG. 24. For example, if the LED device 3a includes the LEDs 3r, 3g, and 3b, a triple bandpass filter having the optical transmission range within each of the optical wavelength ranges of the spectral characteristics of the LEDs 3r, 3g, and 3b can be employed.

Furthermore, if a filter is formed of a dielectric layer, the filter reflects a light with a wavelength that is out of the transmission range of the filter. Therefore, if the filter is placed on the lens or the photodetecting unit 5, a reflected-light absorption process such as distribution of absorbing substance capable of absorbing the reflected light needs to be performed to prevent stray light or optical flare.

In the above embodiment, a situation is described in which the optical wavelength range of the spectral characteristics of the LED is not uniform and the reflection characteristics of the original Gp, which is to be irradiated with a light, varies in an optical wavelength range corresponding to the optical wavelength range of the spectral characteristics of the LED.

Figure 25:
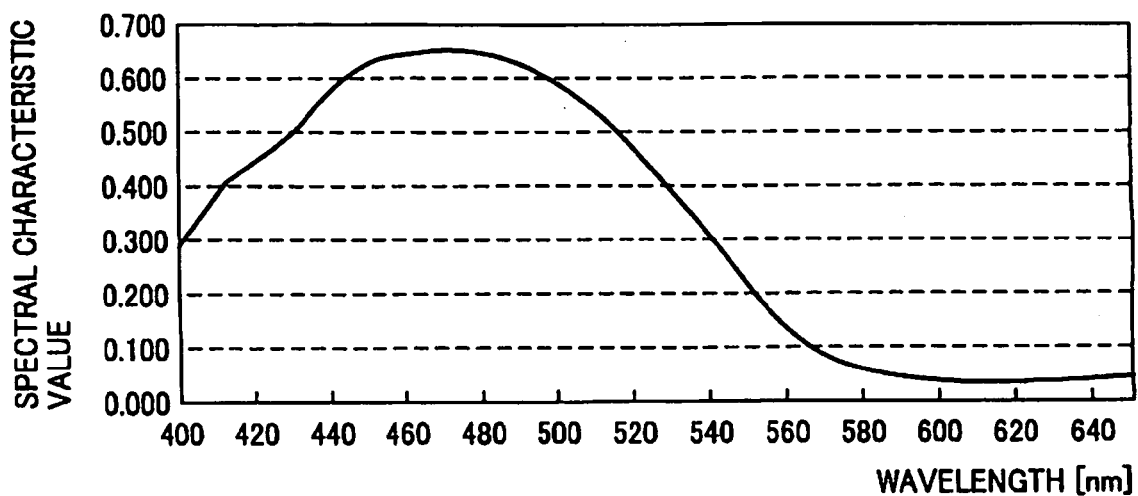
FIG. 25 is a graph of an example of spectral characteristics of an original in cyan.

Furthermore, because even the same type of LEDs emit lights with different optical wavelengths, even when originals in a color whose spectral characteristics is uniform are to be irradiated with lights from the same type of LEDs, electrical signal levels obtained by OE conversion using reflected lights or transmitted lights from the originals depend on the range of variation in the optical wavelengths of the LEDs and effects of the spectral characteristics of the originals. FIG. 25 is a graph of spectral characteristics of an original in cyan with respect to a wavelength. In the graph shown in FIG. 25, an X-axis represents a wavelength (nanometers) and a Y-axis represents a spectral characteristic value (a reflection characteristic value).

Figure 26:
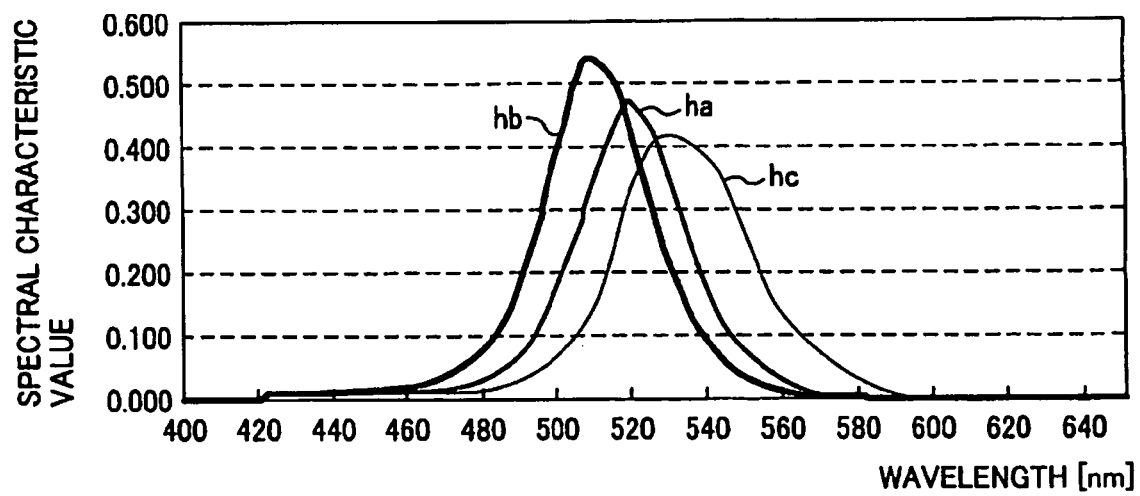
FIG. 26 is a graph of output characteristics obtained when the reflected lights having the spectral/reflection characteristics shown in FIG. 25 are subjected to OE conversion by the CCD array shown in FIG. 1.

Assuming that a light corresponding to each of the spectral characteristics shown in FIG. 15 is applied from an LED of the light source unit 3 to the original Gp having the spectral characteristics shown in FIG. 25 in the image sensor 1, the spectral characteristics (reflection characteristics) on the surface of the original Gp corresponds to each of characteristic curves ha, hb, and hc shown in FIG. 26. Each of the characteristic curves ha, hb, and hc is obtained by multiplication of each of the spectral characteristics of the LED and the reflection characteristics of the original Gp. FIG. 26 is a graph of spectral characteristics of reflected lights when a light in a wavelength corresponding to green is applied from an LED to the original whose color is cyan and having the spectral characteristics shown in FIG. 25.

Figure 27:
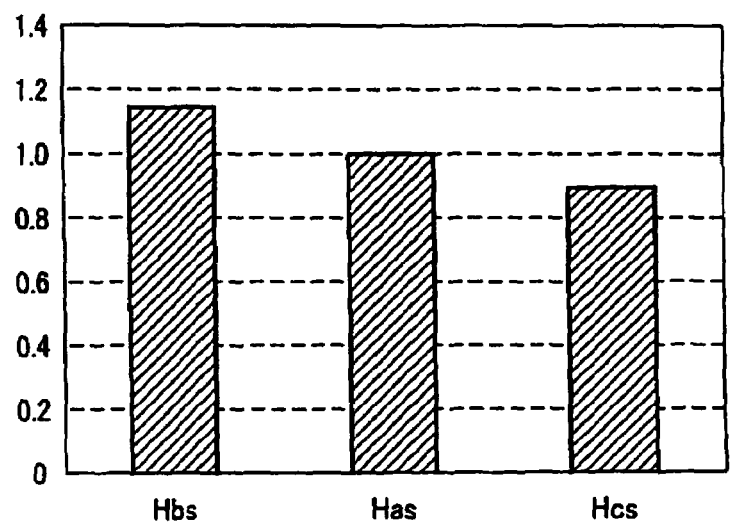
FIG. 27 is a graph of transmission characteristics of a filter placed for the LEDs having the spectral characteristics shown in FIG. 15 in the image sensor shown in FIG. 1.

Assuming that lights having the spectral characteristics corresponding to the spectral characteristics curves Ha, Hb, and Hc shown in FIG. 15 are applied from the LEDs to the original Gp having the spectral characteristics shown in FIG. 25, and the reflected lights from the original Gp are input into the photodetecting unit 5 and then subjected to OE conversion by the CCD array 6 of the photodetecting unit 5. Then, as shown in FIG. 27, outputs from the CCD array 6 (CCD array outputs) Has, Hbs, and Hcs corresponding to lights having the spectral characteristic curves Ha, Hb, and Hc of the LED become proportional to integrated values of the characteristic curves ha, hb, and hc shown in FIG. 26, respectively. The CCD array outputs Has, Hbs, and Hcs shown in FIG. 27 are normalized integrated values of the characteristic curves ha, hb, and hc based on assumption that the integrated value Has of the characteristic curve ha is normalized to 1.

Thus, because the optical wavelengths are not uniform even by the same type of LEDs, when originals in a color whose spectral characteristics is uniform are irradiated with lights from the same type of LEDs, electrical signal levels obtained by OE conversion with reflected lights or transmitted lights from the originals depend on the range of variation in the optical wavelengths of the LEDs and the spectral characteristics of the original. As a result, outputs from the image sensor 1 vary and thereby image quality of a read image is degraded.

In the image sensor 1, the filter having the optical wavelength range that covers the range of variation in the optical wavelength range of the spectral characteristics of the LED, and the optical transmission range within the optical wavelength range of the spectral characteristics of the LED is placed in the optical path from the LED device 3a to the CCD array 6. For example, when the LED of the LED device 3a has the spectral characteristics over the optical wavelength range whose center is at about 520 nanometers as shown in FIG. 15, a filter having the optical transmission range over an optical wavelength range from 512 nanometers to 522 nanometers as shown in FIG. 28 is used.

Figure 29:
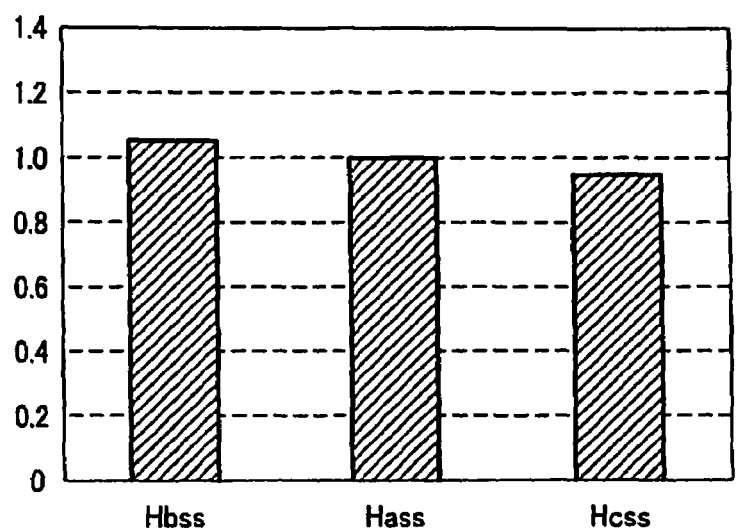
FIG. 29 is a graph of spectral/transmission/black-white correction characteristics obtained based on assumption that black and white correction are performed on the lights having the spectral/transmission characteristics shown in FIG. 28.

When the shading correcting unit 22 performs correction on outputs from the CCD array 6 by using the filter in the manner described above, output values Hass, Hbss, and Hcss shown in FIG. 29 are obtained. Compared to the values shown in FIG. 27, variation in the output values Hass, Hbss, an Hcss shown in FIG. 29 are about half of those among the output values Has, Hbs, and Hcs obtained when the filter is not used as shown in FIG. 27. Thus, by using the filter, variation in the outputs from the image sensor, that is, the outputs from the CCD array 6 can be suppressed and thereby image quality of a read image can be improved.

A method of manufacturing the filter is described below. A process of calculating spectral characteristics of the same type of LEDs having the optical wavelength ranges of the spectral characteristics as described above is firstly performed. Due to this, the spectral characteristics as shown in FIG. 15 are obtained. Subsequently, a light is applied from each of the LEDs to the original Gp having the uniform spectral characteristics as shown in FIG. 16 or FIG. 25. Then, output characteristics of the CCD array 6 that has received the reflected lights from the original Gp are calculated. A process of acquiring variation of the optical wavelength range of the LED is performed based on the calculated spectral characteristics of the same type of LEDs and the output characteristics of the CCD array 6. The variation of the optical wavelength range of the LED is obtained from the output values Ha, Hb, and Hc shown in FIGS. 17 and 26 and the output values Has, Hbs, and Hcs shown in FIGS. 18, 27, and 29. Subsequently, a process of determining an optical transmission range that is within the optical wavelength range of the spectral characteristics of the LED and covers the range of variation in the optical wavelength range of the LED is performed. The optical transmission range that covers the range of the variation in the optical wavelength range of the LED is, for example, one of those shown in FIGS. 19, 28, and 30. Then, a process for manufacturing the filter having the determined optical transmission range is performed using known techniques. Thus, the filter according to the embodiment can be manufactured.

Figure 28:
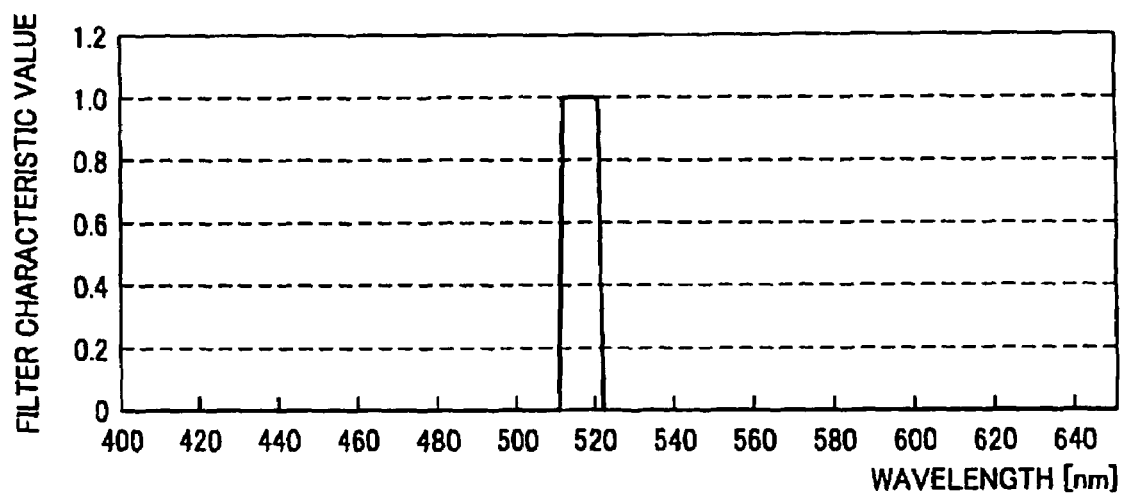
FIG. 28 is a graph of spectral/transmission characteristics obtained when the lights having the spectral characteristics shown in FIG. 15 pass through the filter having the transmission characteristics shown in FIG. 27.

In the example shown in FIG. 28, the filter has the optical transmission range in the optical wavelength range from 512 nanometers to 522 nanometers. As the optical transmission range is set narrower, variation in the outputs from the CCD array 6 decreases. However, if the optical transmission range becomes too narrow, effects of S/N ratio due to reduction of light intensity increase. Therefore, the optical transmission range of the filter can be set wider than that shown in FIG. 28.

Figure 30:
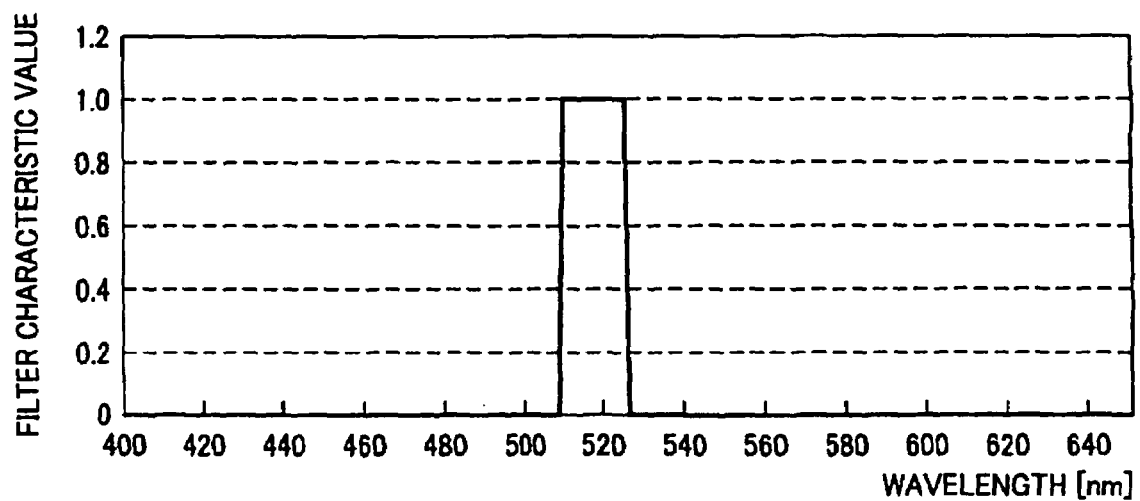
FIG. 30 is a graph of an example of spectral/transmission characteristics of another filter.
Figure 31:
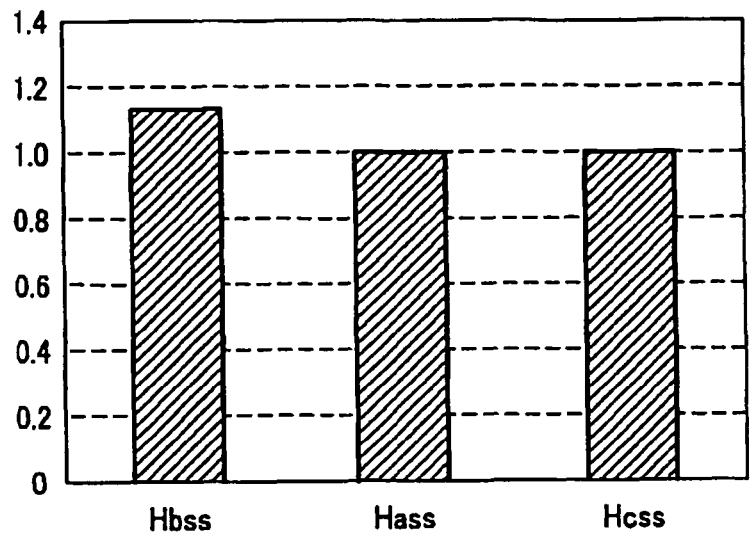
FIG. 31 is a graph of spectral/transmission/black-white correction characteristics obtained based on assumption that black and white correction are performed on the lights having the spectral/transmission characteristics shown in FIG. 30.

FIG. 30 is a graph of filter characteristics of a filter whose optical transmission range is substantially twice as that shown in FIG. 28 (i.e., from about 508 nanometers to about 528 nanometers). When lights having the spectral characteristics shown in FIG. 15 are applied from the LEDs to the original having the spectral characteristics shown in FIG. 25 by using the above-mentioned filter, output values Hass, Hbss, and Hcss, which are obtained after shading correction is performed, are obtained as shown in FIG. 31. As shown in FIG. 31, variation in the output values Hass, Hbss, and Hcss are slightly large compared to those shown in FIG. 29. However, with the output values Hass, Hbss, and Hcss, effects of S/N ratio can be reduced.

In the description of FIG. 25, explanation about the spectral characteristics of the original in cyan and the optical transmission range of the filter for the original Gp having such spectral characteristics is given. However, the optical transmission range of the filter can be determined in the above-described manner with respect to the spectral characteristics of another original in different color, such as yellow and magenta.

Figure 32:
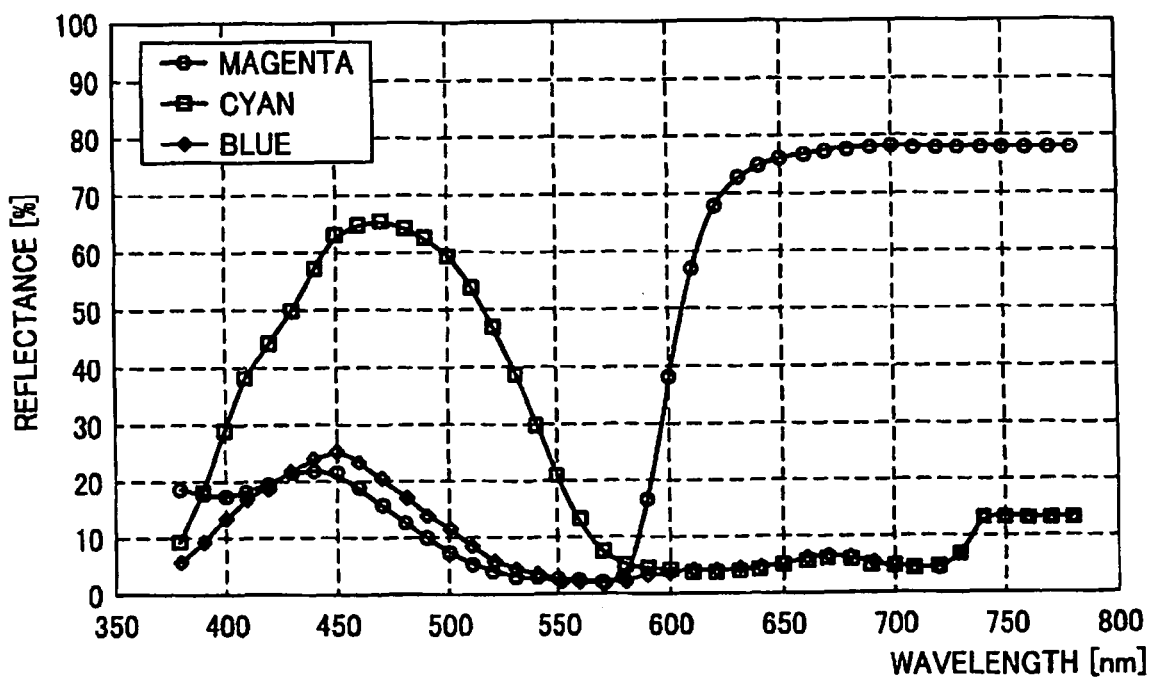
FIG. 32 is a graph of an example of spectral characteristics of originals in magenta, cyan, and blue with respect to a wavelength.
Figure 33:
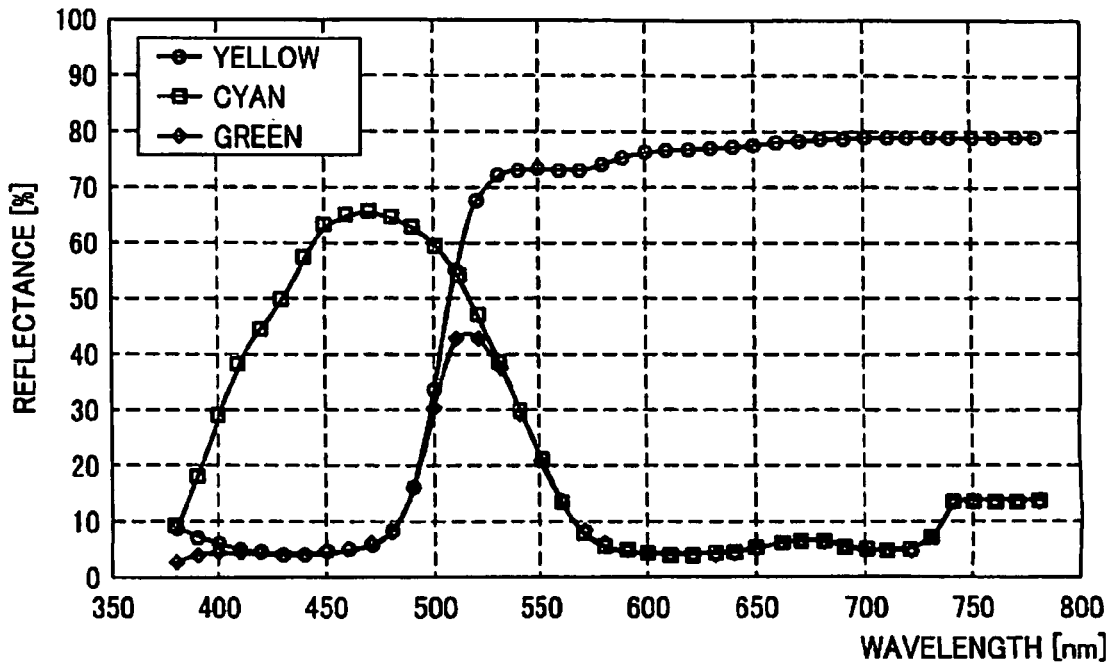
FIG. 33 is a graph of an example of spectral characteristics of originals in yellow, cyan, and green with respect to a wavelength.
Figure 34:
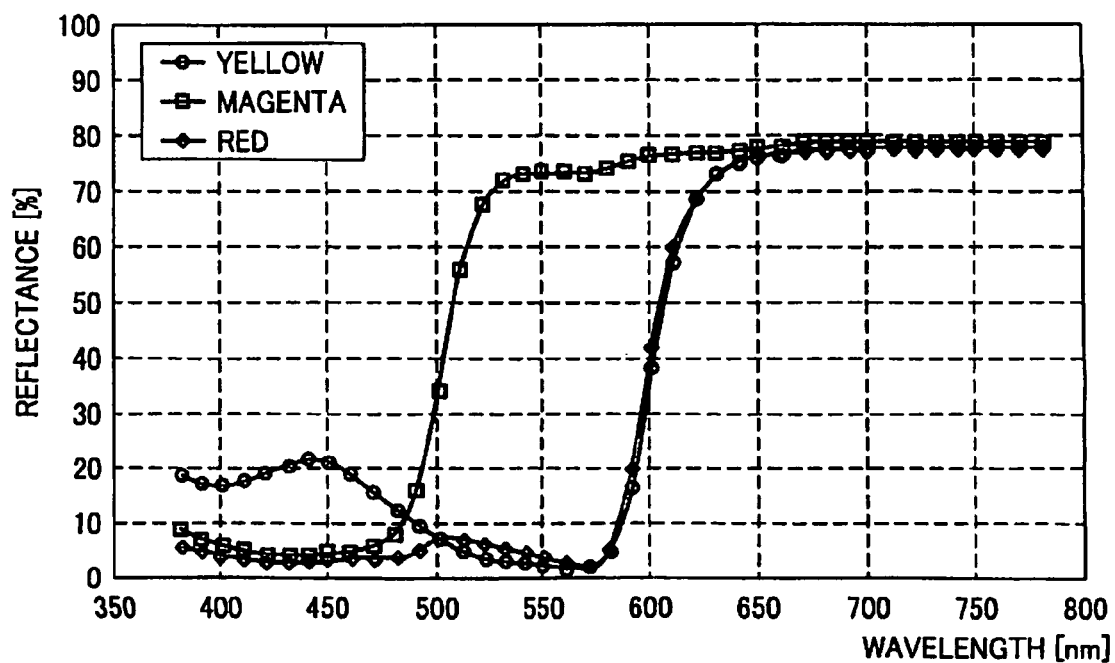
FIG. 34 is a graph of an example of spectral characteristics of originals in yellow, magenta, and red with respect to a wavelength.

FIG. 32 is a graph of an example of spectral characteristics (reflectance) of originals in magenta, cyan, and blue with respect to a wavelength. FIG. 33 is a graph of an example of spectral characteristics (reflectance) of originals in yellow, cyan, and green with respect to a wavelength. FIG. 34 is a graph of an example of spectral characteristics (reflectance) of originals in yellow, magenta, and red with respect to a wavelength. Even when wavelengths of LEDs are different from one to the other, countermeasure can be attained by setting an optical transmission range of a filter such that a range of variation in spectral characteristics of originals having the spectral characteristics as mentioned above is covered.

As described above, the image sensor 1 is applied to an image reading device such as a multifunction peripheral, a copier, and a facsimile machine.

Therefore, quality of an image read by such an image reading device can be improved and thereby availability of read image data can be enhanced.

Moreover, when the light source unit 3 includes the LEDs 3r, 3g, and 3b, the LEDs 3r, 3g, and 3b are configured to emit lights at different timings. In this situation, three filters are placed for the LEDs 3r, 3g, and 3b, respectively, in optical paths through which lights emitted from the LEDs 3r, 3g, and 3b travel to the original Gp and the reflected lights from the original Gp travel to the CCD array 6. At this state, the filters have the optical transmission ranges within the optical wavelength ranges of the spectral characteristics of the LEDs 3r, 3g, and 3b, respectively.

Therefore, even when the optical wavelength ranges of the spectral characteristics of the LEDs 3r, 3g, and 3b are not uniform because the LEDs 3r, 3g, and 3b are at low ranks of low costs, and the reflection characteristics of the original Gp to be irradiated with the lights also varies, effects of the variation in the above characteristics can be compensated by the filter having the optical transmission range within each of the optical wavelength ranges of the spectral characteristics of the LEDs 3r, 3g, and 3b. Thus, outputs from the CCD array 6 can be stabilized. As a result, it is possible to improve quality of image data output from the CCD array 6 and availability of the image data with less cost.

Furthermore, the image sensor 1 includes the filter having the optical transmission range corresponding to each of the optical wavelength of the LEDs 3r, 3g, and 3b, and the optical transmission range within each of the optical wavelength ranges of the spectral characteristics of the LEDs 3r, 3g, and 3b.

Therefore, effects of the variation in the optical wavelength range of the spectral characteristics of each of the LEDs 3r, 3g, and 3b and the reflection characteristics of the original Gp can be compensated even by a filter that is small and less expensive. Thus, quality of image data output from the CCD array 6 can be improved with less costs and the image sensor 1 can be compact.

Moreover, in the image sensor 1, the filter is placed in an optical path from each of the LEDs 3r, 3g, and 3b of the light source unit 3 to the original Gp.

Therefore, variation in lights to be applied to the original Gp can be compensated, and variation in the reflected lights from the original Gp toward the CCD array 6 can be suppressed. Thus, outputs from the CCD array 6 can be stabilized. As a result, it is possible to improve quality of image data output from the CCD array 6 and availability of the image data with less cost.

Moreover, when the light source unit 3 includes the waveguide unit 3b, the filter can be placed in an optical path from the LED to the waveguide unit 3b. For example, the filter can be placed on an irradiating member of the waveguide unit 3b.

With this arrangement, an area of the filter can be small and thereby the image sensor 1 can be compact.

Furthermore, the filter can be placed in an optical path from the original Gp to the CCD array 6.

With this configuration, the filter can be easily placed, and thereby, another filter can be additionally placed regardless of a structure of the light source unit 3 and even after the image reading device is assembled.

Moreover, the filter can be placed on an irradiating member in a preceding stage of the CCD array 6 or near the CCD array 6.

With this configuration, the filter can be easily placed, and thereby, versatility of the image reading device can be enhanced.

In the above description, preferable embodiments are used. However, the present invention is not limited to the specific details and examples mentioned above. Accordingly, various modifications can be made without departing from the scope of the general inventive concept as defined by the appended claims.

Furthermore, the constituent elements in the above description do not necessarily have to be arranged in the above-mentioned manner. In other words, the specific mode in which the constituent elements are distributed and integrated is not limited to the ones mentioned above. A part or all of the constituent elements can be distributed or integrated in any arbitrary way. Moreover, the constituent elements described in different embodiments can be combined with each other as appropriate.

According to one aspect of the present invention, a filter having an optical transmission range that is within an optical wavelength range of spectral characteristics of an light emitting element and covers a range of variation in the optical wavelength range of the light emitting element, in an optical path through which a light emitted from the light emitting element travels to a target object and the reflected light or the transmitted light from the target object travels to a photodetecting element. Therefore, if a target object whose spectral characteristics is uniform is irradiated with a light from the light emitting element, variation in an electrical signal level due to variation in the optical wavelength of the light emitting element can be compensated by the optical transmission characteristics of the filter that has an optical transmission range within the optical wavelength range of the spectral characteristics of the light emitting element. As a result, it is possible to suppress variation in level of outputs from the photodetecting element due to variation in the optical wavelength of the light emitting element. Thus, quality of the read image can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical device comprising:
   a light source unit that includes a plurality of light emitting elements having different spectral characteristics in different optical wavelength ranges from each of which a light is output to a scanning target;
   a photodetecting unit that performs an optical-to-electrical conversion of either one of a reflected light and transmitted light received from the scanning target by a photodetecting element included in the photodetecting unit; and
   a plurality of filters each of which is arranged, so as to correspond to each of the light emitting elements, in an optical path from the light emitting element to the photodetecting element via the scanning target and has an optical transmission range within the optical wavelength range of the spectral characteristics of the corresponding light emitting element and covering at least a range of variation of a peak wavelength in the spectral characteristics of the corresponding light emitting element when the spectral characteristics show variation.

2. An image reading device including an optical device that irradiates an original with a light, performs an optical-to-electrical conversion of either one of a reflected light and a transmitted light, the image reading device reading an image of the original by using an electrical signal output from the optical device, wherein the optical device includes:
   a light source unit that includes a plurality of light emitting elements having different spectral characteristics in different optical wavelength ranges from each of which a light is output to a scanning target;
   a photodetecting unit that performs the optical-to-electrical conversion of either one of a reflected light and transmitted light received from the scanning target by a photodetecting element included in the photodetecting unit; and a plurality of filters each of which is arranged, so as to correspond to each of the light emitting elements, in an optical path from the light emitting element to the photodetecting element via the scanning target and has an optical transmission range within the optical wavelength range of the spectral characteristics of the corresponding light emitting element and covering at least a range of variation of a peak wavelength in the spectral characteristics of the corresponding light emitting element when the spectral characteristics show variation.

3. The image reading device according to claim 2, wherein the filter is provided on an optical path from the plurality of light emitting elements to the scanning target.

4. The image reading device according to claim 2, wherein the light source unit further includes a waveguide unit that guides a light emitted from the plurality of light emitting elements to the scanning target, and the plurality of filters is provided on an optical path through which the light travels from the plurality of light emitting elements to the waveguide unit.

5. The image reading device according to claim 2, wherein the plurality of filters is provided in an optical path from the scanning target to the photodetecting unit.

* * * * *